United States Patent
Yamanaka et al.

(10) Patent No.: US 12,088,950 B2
(45) Date of Patent: Sep. 10, 2024

(54) IMAGE-CAPTURING APPARATUS, CONTROL METHOD, AND PROGRAM

(71) Applicants: Sony Corporation, Tokyo (JP); Sony Semiconductor Solutions Corporation, Kanagawa (JP)

(72) Inventors: Go Yamanaka, Kanagawa (JP); Yasuhiro Yukawa, Kanagawa (JP); Takuya Yamaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/288,432

(22) PCT Filed: Oct. 18, 2019

(86) PCT No.: PCT/JP2019/041037
§ 371 (c)(1),
(2) Date: Apr. 23, 2021

(87) PCT Pub. No.: WO2020/090512
PCT Pub. Date: May 7, 2020

(65) Prior Publication Data
US 2021/0400209 A1    Dec. 23, 2021

(30) Foreign Application Priority Data

Oct. 31, 2018 (JP) .................................. 2018-204836
Mar. 5, 2019 (JP) .................................. 2019-039216

(51) Int. Cl.
*H04N 5/262* (2006.01)
*B60R 1/26* (2022.01)
(Continued)

(52) U.S. Cl.
CPC ............. *H04N 5/2628* (2013.01); *B60R 1/26* (2022.01); *H04N 7/18* (2013.01); *H04N 23/80* (2023.01); *B60R 2300/30* (2013.01)

(58) Field of Classification Search
CPC ...... H04N 5/2628; H04N 5/2322; H04N 7/18; B60R 1/00; B60R 2300/30
See application file for complete search history.

(56) References Cited

U.S. PATENT DOCUMENTS 7,554,461 B2 *   6/2009   Edanami ............ B62D 15/0275
                                                    340/932.2
8,180,109 B2 *   5/2012   Akiba .................. H04N 5/2628
                                                    382/104
(Continued)

FOREIGN PATENT DOCUMENTS

CN      102582516 A      7/2012
CN      109076163 A      12/2018
(Continued)

OTHER PUBLICATIONS

International Search Report and English translation thereof mailed Dec. 24, 2019 in connection with International Application No. PCT/JP2019/041037.

(Continued)

*Primary Examiner* — Boubacar Abdou Tchoussou
(74) *Attorney, Agent, or Firm* — Wolf, Greenfield & Sacks, P.C.

(57) ABSTRACT

An image-capturing apparatus, a control method, and a program that make it possible to easily provide an image suitable for the operation of a vehicle. The controller controls reading of an image from an image sensor that captures the image, on the basis of vehicle information acquired by a vehicle, the image being displayed on a display section of the vehicle. Embodiments may be applicable to a viewing system that displays an image of a region behind a vehicle.

16 Claims, 26 Drawing Sheets

(51) Int. Cl.
*H04N 7/18* (2006.01)
*H04N 23/80* (2023.01)

(56) References Cited

U.S. PATENT DOCUMENTS

| | | | | |
|---|---|---|---|---|
| 8,363,103 | B2* | 1/2013 | Ichinose | G06T 3/0031 |
| | | | | 348/148 |
| 9,189,701 | B2* | 11/2015 | Nomoto | G06K 9/4604 |
| 9,973,734 | B2* | 5/2018 | Watanabe | B60R 1/00 |
| 10,322,672 | B2* | 6/2019 | Watanabe | B60K 35/00 |
| 10,392,013 | B2* | 8/2019 | Hakki | G08G 1/168 |
| 10,406,917 | B2* | 9/2019 | Hassani | B60K 31/0066 |
| 10,676,028 | B2* | 6/2020 | Taniguchi | B60R 1/12 |
| 10,735,638 | B2* | 8/2020 | Bareman | H04N 23/62 |
| 10,866,415 | B2* | 12/2020 | Nagano | H04N 9/3194 |
| 11,273,763 | B2* | 3/2022 | Suda | B60R 1/00 |
| 11,394,926 | B2* | 7/2022 | Yokota | H04N 5/2628 |
| 2005/0237385 | A1 | 10/2005 | Kosaka et al. | |
| 2007/0279493 | A1* | 12/2007 | Edanami | B62D 15/0275 |
| | | | | 348/148 |
| 2008/0253616 | A1 | 10/2008 | Mizuno et al. | |
| 2015/0375680 | A1* | 12/2015 | Watanabe | B60K 35/00 |
| | | | | 701/36 |
| 2016/0182863 | A1* | 6/2016 | Watanabe | H04N 7/181 |
| | | | | 348/148 |
| 2016/0263997 | A1* | 9/2016 | Mizutani | B60R 1/00 |
| 2016/0373684 | A1 | 12/2016 | Sherman et al. | |
| 2018/0242451 | A1 | 8/2018 | Chopra | |
| 2018/0270406 | A1* | 9/2018 | Bareman | H04N 23/66 |
| 2019/0124277 | A1 | 4/2019 | Mabuchi | |
| 2019/0248288 | A1 | 8/2019 | Oba | |
| 2020/0111227 | A1* | 4/2020 | Kijima | B60W 40/11 |
| 2020/0298769 | A1* | 9/2020 | Ha | G06V 20/56 |
| 2021/0400241 | A1 | 12/2021 | Yamanaka et al. | |

FOREIGN PATENT DOCUMENTS

| | | |
|---|---|---|
| CN | 109417611 A | 3/2019 |
| EP | 3451651 A1 | 3/2019 |
| EP | 3487172 A1 | 5/2019 |
| JP | 2005323190 A | 11/2005 |
| JP | 2006-254318 A | 9/2006 |
| JP | 2014201146 A | 10/2014 |
| JP | 6245274 B2 | 12/2017 |
| JP | 2018-012439 A | 1/2018 |
| WO | WO-2015083228 A1 | 6/2015 |
| WO | 2017/187811 A1 | 11/2017 |
| WO | 2018/012299 A1 | 1/2018 |

OTHER PUBLICATIONS

International Written Opinion and English translation thereof mailed Dec. 24, 2019 in connection with International Application No. PCT/JP2019/041037.

International Preliminary Report on Patentability and English translation thereof mailed May 14, 2021 in connection with International Application No. PCT/JP2019/041037.

* cited by examiner

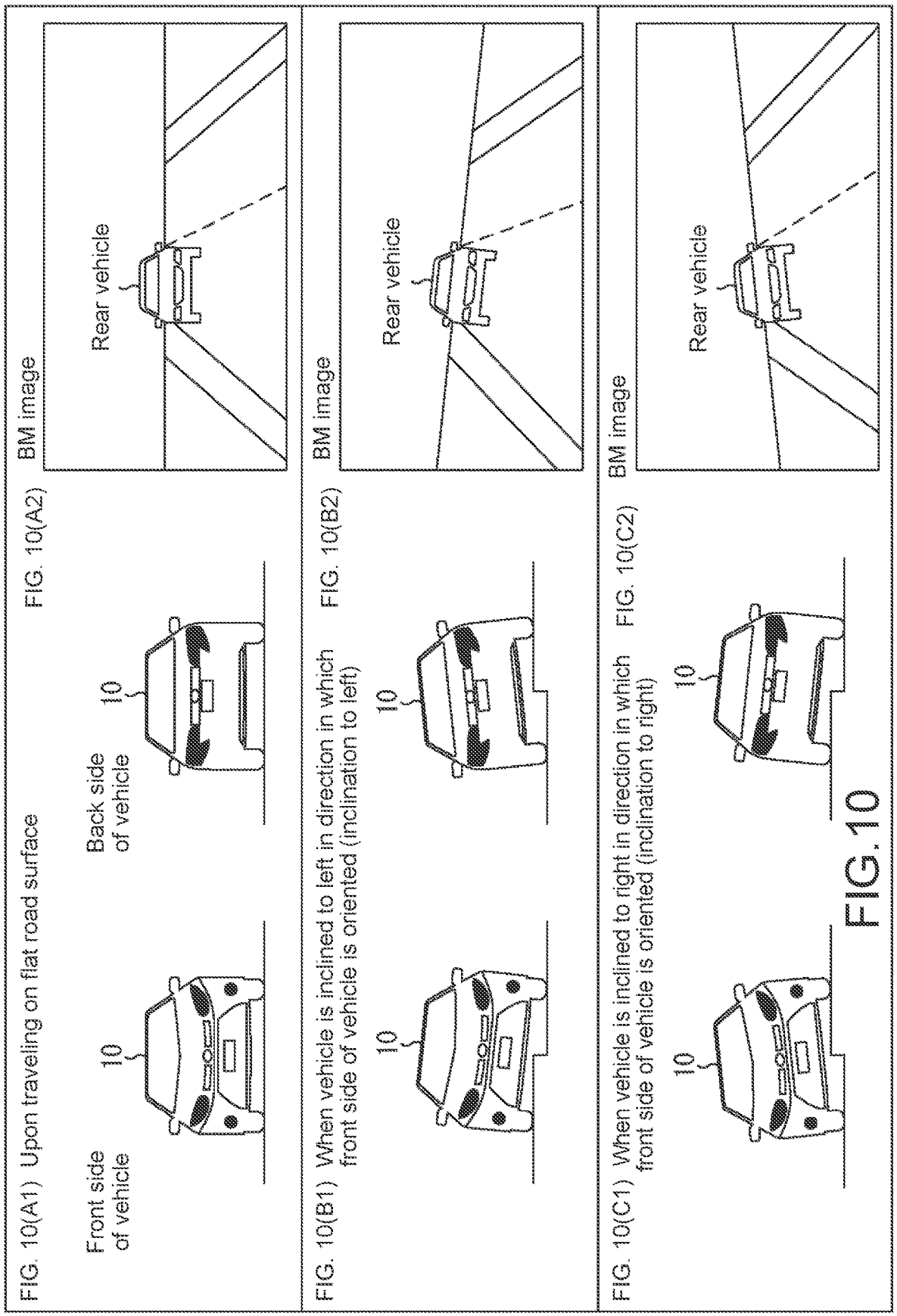

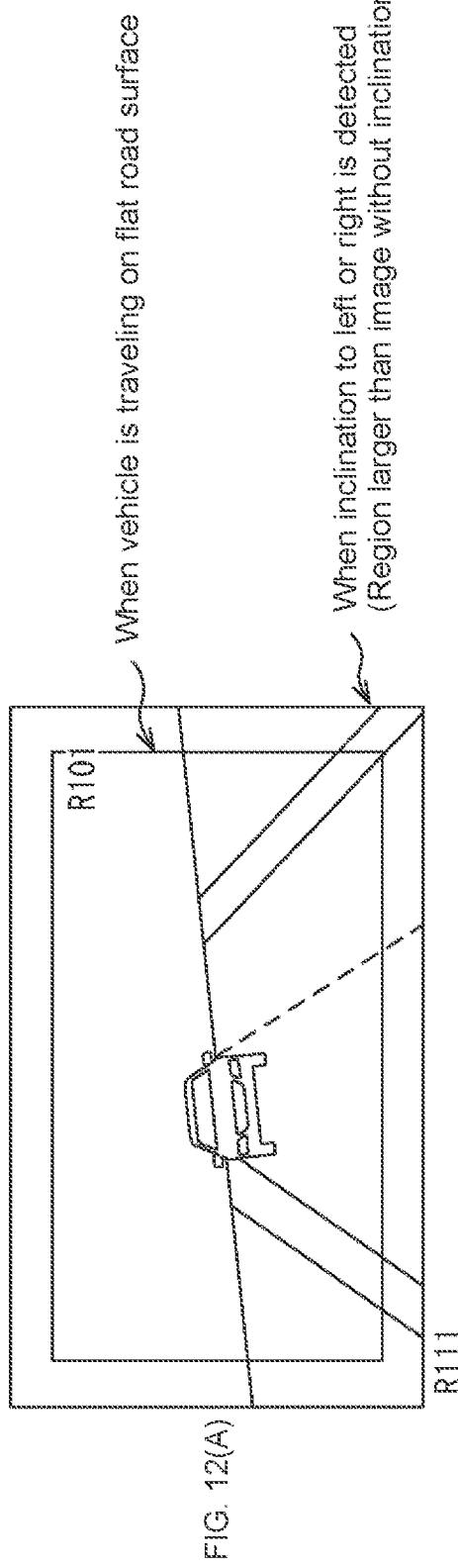
FIG. 12(A)
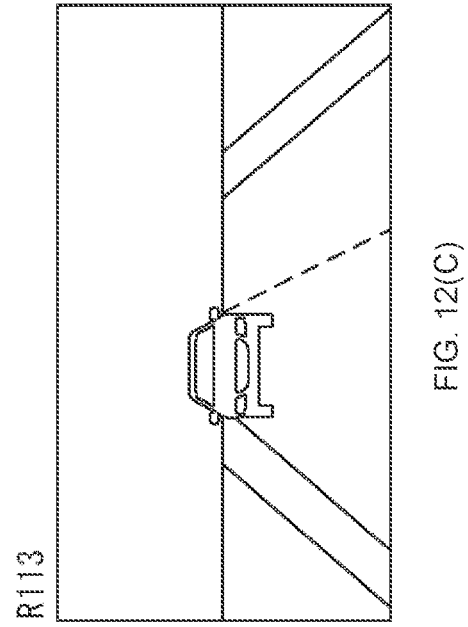
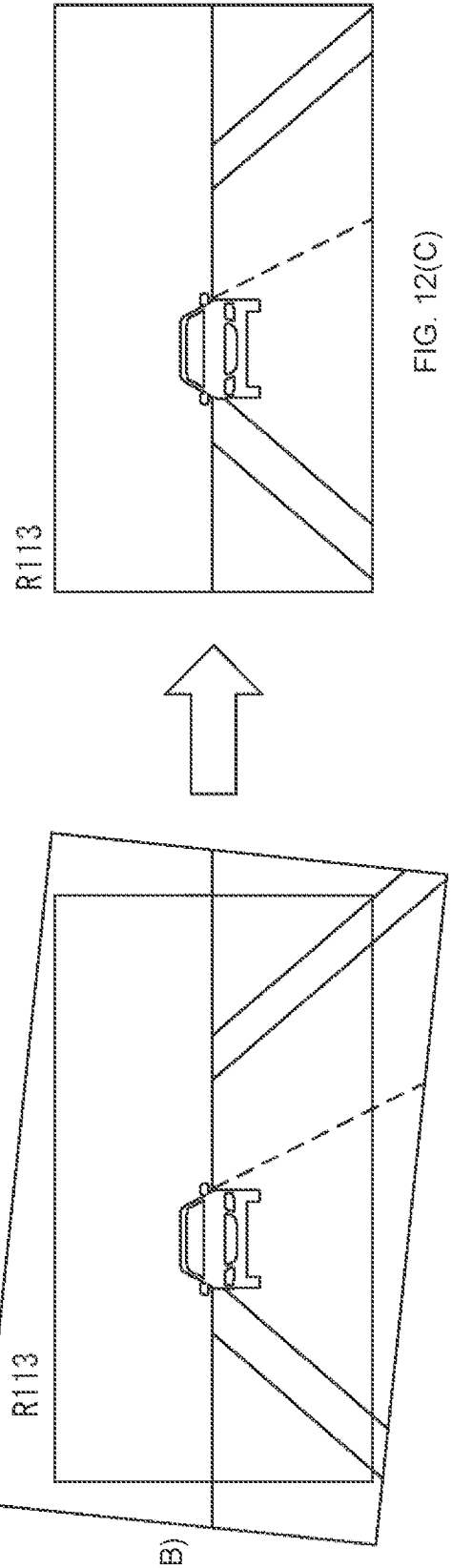
FIG. 12(B)
FIG. 12(C)

BM image

· Resolution RBM
· YUV 4:2:2 format
· 8 bits per pixel

RV image

· Resolution RRV
· YUV 4:2:2 format
· 8 bits per pixel

FIG.19

IMAGE-CAPTURING APPARATUS, CONTROL METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/041037, filed in the Japanese Patent Office as a Receiving Office on Oct. 18, 2019, which claims priority to Japanese Patent Application Numbers JP2019-039216, filed in the Japanese Patent Office on Mar. 5, 2019; and JP2018-204836, filed in the Japanese Patent Office on Oct. 31, 2018, each of which is hereby incorporated by reference in its entirety.

TECHNICAL FIELD

The present technology relates to an image-capturing apparatus, a control method, and a program. In particular, the present technology relates to, for example, an image-capturing apparatus, a control method, and a program that make it possible to easily provide an image suitable for the operation of a vehicle.

BACKGROUND ART

For example, a viewing system in which a camera that is an image-capturing apparatus is installed in the rear of a vehicle such as an automobile and an image of a region behind the vehicle that is captured using the camera is displayed, is proposed.

Examples of the image of a region behind a vehicle that is provided by the viewing system include an image of a region situated further rearward than a region just behind the rear of the vehicle, and an image of the region just behind the rear of the vehicle.

Here, the image of a region situated further rearward than a region just behind the rear of a vehicle is, for example, an image that corresponds to an image seen in a Class I mirror, which is a so-called interior rearview mirror, and is hereinafter also referred to as a back mirror (BM) image. Further, the image of a region just behind the rear of a vehicle is an image of the rear of the vehicle and a region just behind the rear of the vehicle, and is hereinafter also referred to as a rearview (RV) image.

A vehicle is inclined when the vehicle starts going up or down a hill or is traveling on an uneven road surface. Further, the vehicle may also be inclined according to, for example, an object loaded on the vehicle or a state of an occupant of the vehicle.

When the vehicle is inclined, a camera installed in the vehicle is also inclined, and this results in the ratio (the proportion) of the sky, a road, and the like in a BM image being changed from the ratio when the vehicle is not inclined.

When the vehicle is not inclined and when the viewing system is adjusted such that a BM image suitable for the operation of a vehicle is displayed, the BM image suitable for the operation of the vehicle will not be displayed in some cases if the ratio of the sky, a road, and the like in the BM image is changed due to the inclination of the vehicle.

For example, when the vehicle is traveling on a flat road surface, a BM image is displayed that enables a driver to sufficiently recognize, for example, another vehicle that is getting close to the vehicle from behind, or an obstacle behind the vehicle. On the other hand, when the vehicle is inclined, the BM image may include less information necessary for the driver to recognize the other vehicle or the obstacle.

Thus, for example, a technology has been proposed that stores a captured image in a storage and cuts a necessary image out of the captured image when the vehicle is traveling up or down a hill, the captured image being captured using a camera, the storage being situated posterior to the camera (for example, refer to Patent Literature 1).

CITATION LIST

Patent Literature

Patent Literature 1: Japanese Patent No. 6245274

DISCLOSURE OF INVENTION

Technical Problem

When a necessary image is cut out of a captured image stored in the storage, there is a need to read, from the camera, a captured image having a size significantly larger than the size (the number of pixels) of the necessary image. A large size of a captured image read from the camera results in a decrease in frame rate.

Further, there is a demand for a proposal of a technology that makes it possible to easily provide an image suitable for the operation of a vehicle, in addition to the technology that cuts a necessary image out of a captured image stored in a storage situated posterior to a camera.

The present technology has been made in view of the circumstances described above, and is intended to make it possible to easily provide an image suitable for the operation of a vehicle.

Solution to Problem

An image-capturing apparatus according to the present technology is an image-capturing apparatus that includes an image sensor that captures an image displayed on a display section of a vehicle; and a controller that controls reading of the image from the image sensor on the basis of vehicle information acquired by the vehicle.

A control method or a program according to the present technology is a control method or a program, the control method including controlling reading of an image from an image sensor that captures the image, on the basis of vehicle information acquired by a vehicle, the image being displayed on a display section of the vehicle, the program causing a computer to operate as a controller that performs such control.

In an image-capturing apparatus, a control method, and a program according to the present technology, reading of an image from an image sensor that captures the image is controlled on the basis of vehicle information acquired by a vehicle, the image being displayed on a display section of the vehicle.

Note that the image-capturing apparatus may be an independent apparatus or an internal block included in a single apparatus.

Further, the program can be provided by being transmitted through a transmission medium or by being stored in a recording medium.

BRIEF DESCRIPTION OF DRAWINGS

FIG. 10 is a diagram describing a second example of a relationship between a state of the vehicle 10 and a BM image.

FIG. 12 is a diagram further describing an example of the control of reading of a read image that is performed by the controller 71 according to inclination information.

FIG. 19 is a diagram describing an example of a vehicle transmission bandwidth that can be used for data transmission in the vehicle 10.

MODE(S) FOR CARRYING OUT THE INVENTION

Example of Configuration of Vehicle Including Viewing System

Figure 1:
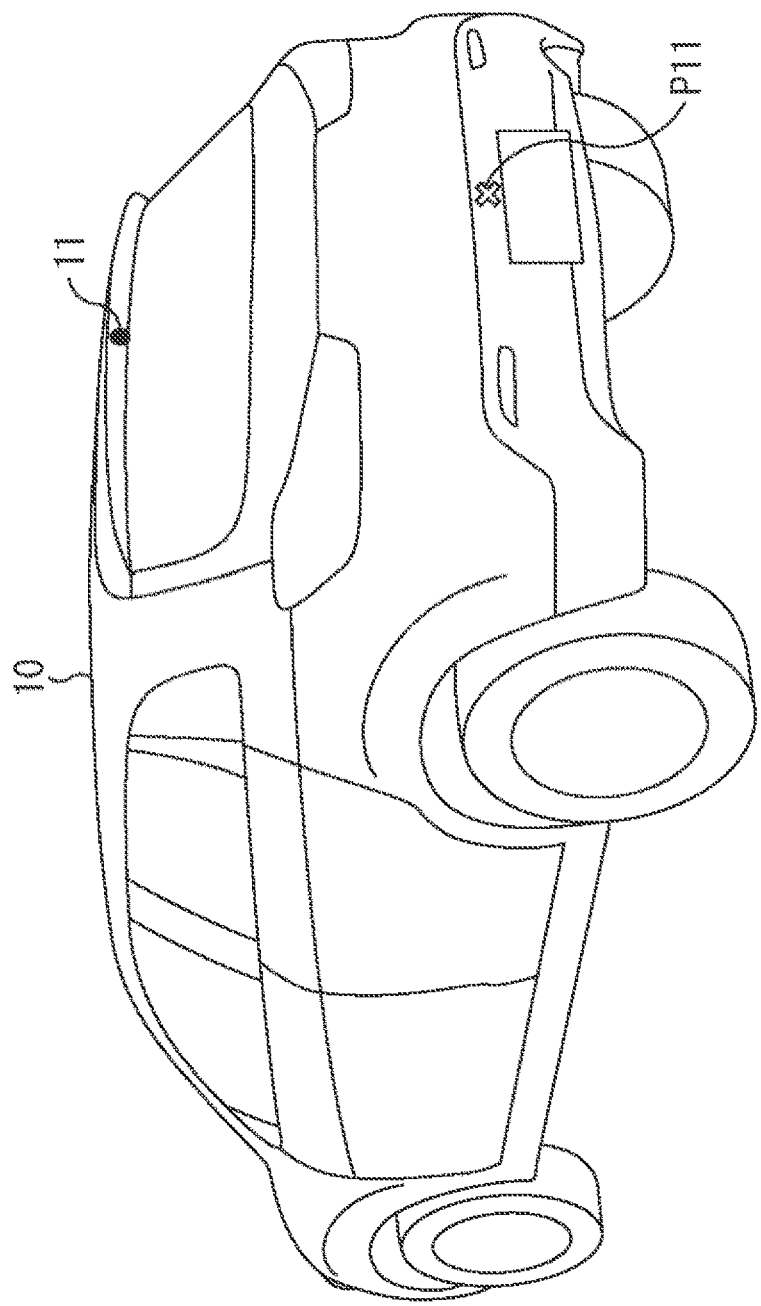
FIG. 1 is a perspective view illustrating an external configuration example of a vehicle 10 that includes a viewing system according to the present technology.

FIG. 1 is a perspective view illustrating an example of a configuration of an appearance of a vehicle 10 that includes a viewing system to which the present technology is applied.

For example, a camera unit 11 that is an image-capturing apparatus used to capture an image of a region behind the (four-wheeled) vehicle 10 is installed in the rear of the vehicle 10. In FIG. 1, the camera unit 11 is installed above a rear window of the vehicle 10.

The camera unit 11 is a wide-angle camera unit (for example, the angle of view is 120 degrees or more) such that it is possible to capture an image in which both a range corresponding to a BM image and a range corresponding to an RV image appear. Further, the camera unit 11 is a high-resolution camera unit (for example, a resolution of 4K or more) such that a distant subject is apparent in the BM image. Thus, the camera unit 11 is capable of capturing a wide-angle, high-resolution image.

Note that, in the camera unit 11, a BM image and an RV image are extracted from an image captured by the camera unit 11 (hereinafter also referred to as a captured image). This will be described later.

The camera unit 11 is installed in a state in which the orientation of the optical axis has been adjusted, such that the BM image includes an image of a state of a region situated further rearward than a region just behind the rear of the vehicle 10, and such that the RV image includes an image of states of the rear of the vehicle 10 and the region just behind the rear of the vehicle 10, the state of the region situated further rearward than the region just behind the rear of the vehicle 10 being a state that can be observed using an interior rearview mirror (a Class I mirror in Regulation No. 46 defined by the United Nations Economic Commission for Europe <UNECE>) when the interior rearview mirror is installed in the vehicle 10.

Thus, the BM image is an image of a state of a region situated further rearward than a region just behind the rear of the vehicle 10, the state being a state that can be observed using an interior rearview mirror when the interior rearview mirror is installed in the vehicle 10. Further, the RV image is an image of states of the rear of the vehicle 10 and the region just behind the rear of the vehicle 10. The RV image is particularly useful when the vehicle 10 is traveling backward, since a region just behind the rear of the vehicle 10 that is a blind spot of the interior rearview mirror appears in the RV image. Further, the RV image can be used to generate an overhead image obtained when the vehicle 10 is viewed from above.

Note that the camera unit 11 is not limited to being installed above the rear window of the vehicle 10 as long as it is possible to capture a captured image from which the BM image and the RV image described above can be extracted. For example, in addition to being installed above the rear window of the vehicle 10, the camera unit 11 may be installed at, for example, a position P11 above a license plate situated in the rear of the vehicle 10.

Figure 2:
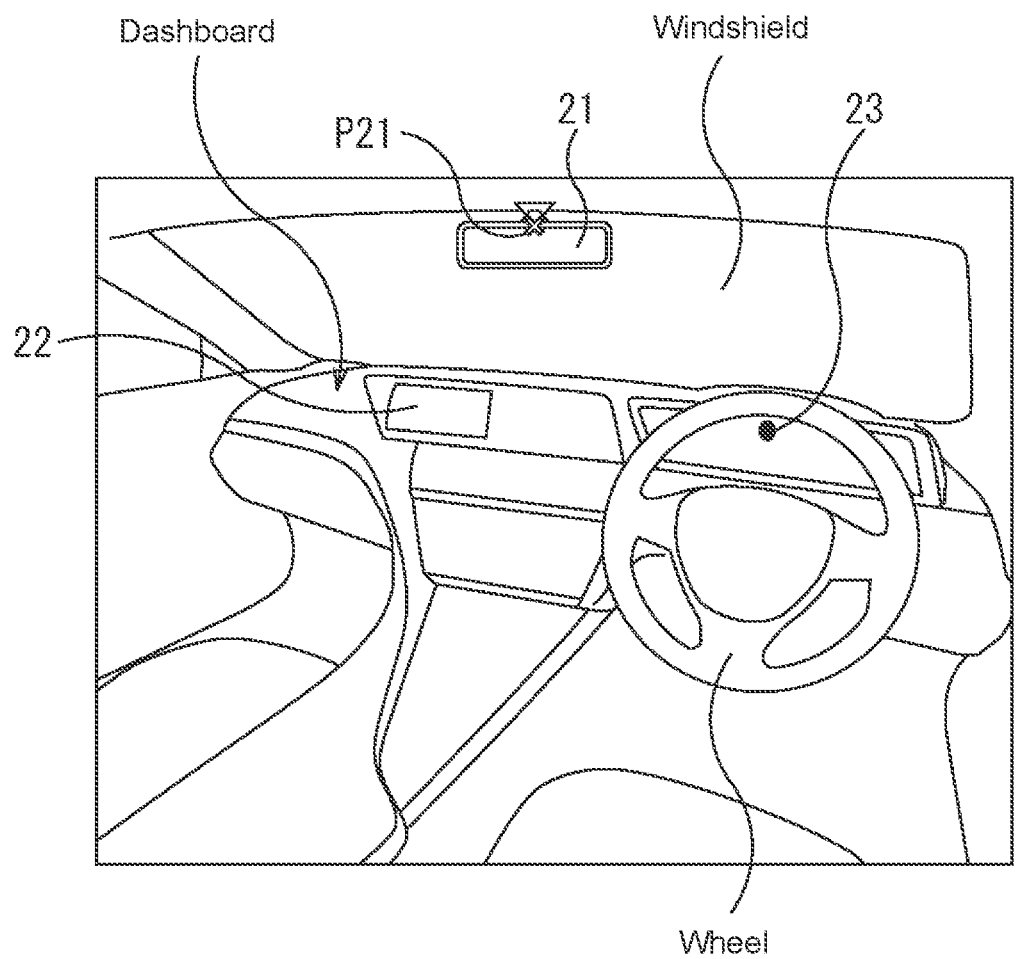
FIG. 2 is a perspective view illustrating an example of a configuration of the interior of the vehicle 10.

FIG. 2 is a perspective view illustrating an example of a configuration of the interior of the vehicle of FIG. 1.

A BM display section 21 that displays thereon a BM image is provided at a position, in the vehicle 10, at which the interior rearview mirror is installed. The BM display section 21 is a display section that is an alternative to the interior rearview mirror.

An RV display section 22 that displays thereon an RV image is provided at a center position of a dashboard in the vehicle 10.

Note that an in-vehicle camera 23 used to capture an image of a driver is provided on the side of a driver's seat of the dashboard in the vehicle 10. An image of the driver is captured to be output by the in-vehicle camera 23. In the vehicle 10, positions of the line of sight and the head of the driver are detected from the image of the driver.

Here, the in-vehicle camera 23 used to capture an image of the driver may be provided at any position other than a position on the dashboard, such as a position P21 above the BM display section 21.

First Example of Configuration of Viewing System

Figure 3:
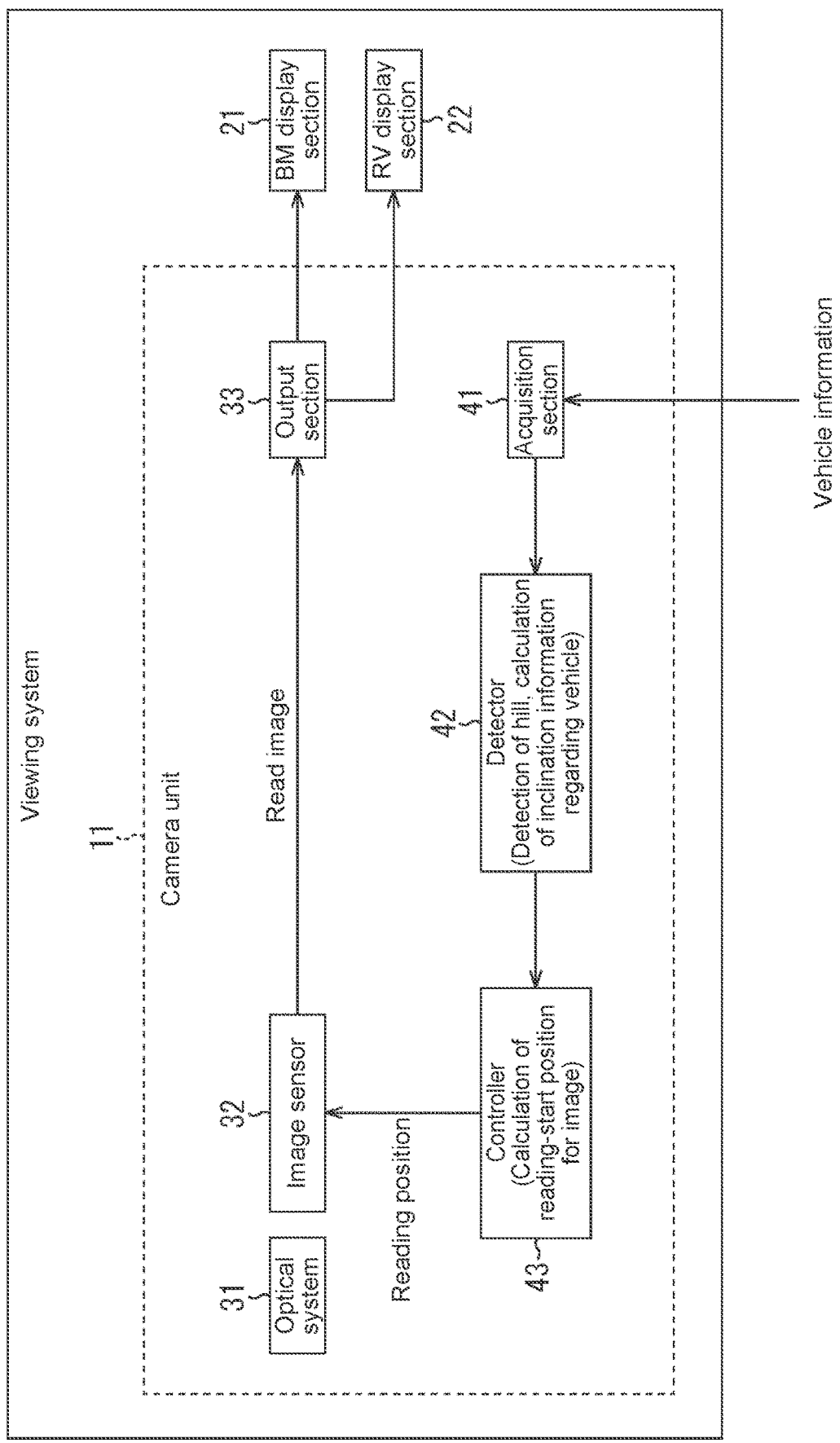
FIG. 3 is a block diagram illustrating a first example of a configuration of the viewing system included in the vehicle 10.

FIG. 3 is a block diagram illustrating a first example of a configuration of the viewing system included in the vehicle 10.

The viewing system includes the camera unit 11, the BM display section 21, and the RV display section described with reference to FIGS. 1 and 2.

The camera unit 11 includes an optical system 31, an image sensor 32, an output section 33, an acquisition section 41, a detector 42, and a controller 43.

The optical system 31 includes optical components such as a condenser and a diaphragm, and collects light entering the optical system 31 onto the image sensor 32.

The image sensor 32 receives light from the optical system 31 and performs photoelectric conversion to capture a captured image that includes images that are a BM image and an RV image. Then, in accordance with control performed by the controller 43, the image sensor 32 reads (the images that are) the BM image and the RV image from the captured image to output the read images. Here, the image read from the captured image and output by the image sensor 32 is also referred to as a read image. The read image output by the image sensor 32 is supplied to the output section 33.

The output section 33 is an output interface (IF) that transmits, to the outside of the camera unit 11, the BM image and the RV image that are read images from the image sensor 32. The output section 33 transmits the BM image to the BM display section 21, and transmits the RV image to the RV display section 22. The BM image from the output section 33 is displayed on the BM display section 21 in accordance with the specification of the BM display section 21, and the RV image from the output section 33 is displayed on the RV display section 22 in accordance with the specification of the RV display section 22. The output section 33 is capable of performing a format conversion and other image processing on the BM image and the RV image as necessary.

The acquisition section 41 acquires (receives), from the vehicle 10 and through a network (a vehicle information network) established in the vehicle 10, vehicle information acquired by the vehicle 10, and supplies the acquired vehicle information to the detector 42.

Here, examples of the vehicle information include any information that can be acquired by the vehicle 10, such as gyroscopic information obtained from a gyroscope of the vehicle 10, suspension information regarding a suspension of the vehicle 10, a front camera image obtained from a front camera used to capture an image of a region ahead of the vehicle 10, GPS information obtained from the Global Positioning System (GPS), traveling information that indicates a traveling state of the vehicle 10 such as a vehicle speed and a traveling direction (forward or backward), positions of the line of sight and the head of a driver of the vehicle 10 that are obtained from an image captured using the in-vehicle camera 23, a three-dimensional (3D) map used for the navigation system of the vehicle 10, and a high-definition map used for an advanced driving assist system (ADAS)/an autonomous driving system. For example, it is possible to adopt, as the vehicle speed, speed information that is output by a speed sensor when the vehicle 10 includes the speed sensor. For example, it is possible to adopt, as the traveling direction, gear information that indicates a state of the transmission.

The acquisition section 41 acquires at least one piece of vehicle information as necessary, and supplies the at least one piece of vehicle information to the detector 42.

In the first example of the configuration of the viewing system, the acquisition section 41 acquires, for example, gyroscopic information, or GPS information and a 3D map (a high-definition map) as the vehicle information, and supplies the acquired vehicle information to the detector 42.

Using the vehicle information from the acquisition section 41, the detector 42 detects (calculates) inclination information that indicates the inclination of the vehicle 10, and supplies the detected inclination information to the controller 43.

The controller 43 controls reading of the read image from the image sensor 32 on the basis of the vehicle information.

For example, the controller 43 controls the reading of the read image from the image sensor 32 according to the inclination information detected by the detector 42 using the vehicle information.

In other words, according to the inclination information supplied from the detector 42, the controller calculates, from a captured image captured by the image sensor 32, a reading-start position for an image that starts being read as a read image, sets the size (the number of pixels) of the read image, and supplies, to the image sensor 32, a reading position specified by the reading-start position and the size. Accordingly, the controller 43 performs a reading control for controlling reading of a read image from the image sensor 32.

The image sensor 32 reads a pixel signal of a pixel of the reading position supplied from the controller 43, and outputs a read image that exhibits a pixel value corresponding to the pixel signal.

Note that, in addition to being specified by the reading-start position and the size, the reading position can be specified by, for example, the reading-start position and a reading-termination position at which reading of a read image is terminated.

Here, in the first example of the configuration of the viewing system, a read image output by the image sensor 32 is the same as a BM image displayed on the BM display section 21 or an RV image displayed on the RV display section 22. Thus, in the first example of the configuration of the viewing system, the size of the BM image displayed on the BM display section 21 or the size of the RV image displayed on the RV display section 22 is set to be the size of a read image.

<Control of Reading of Read Image from Captured Image>

Figure 4:
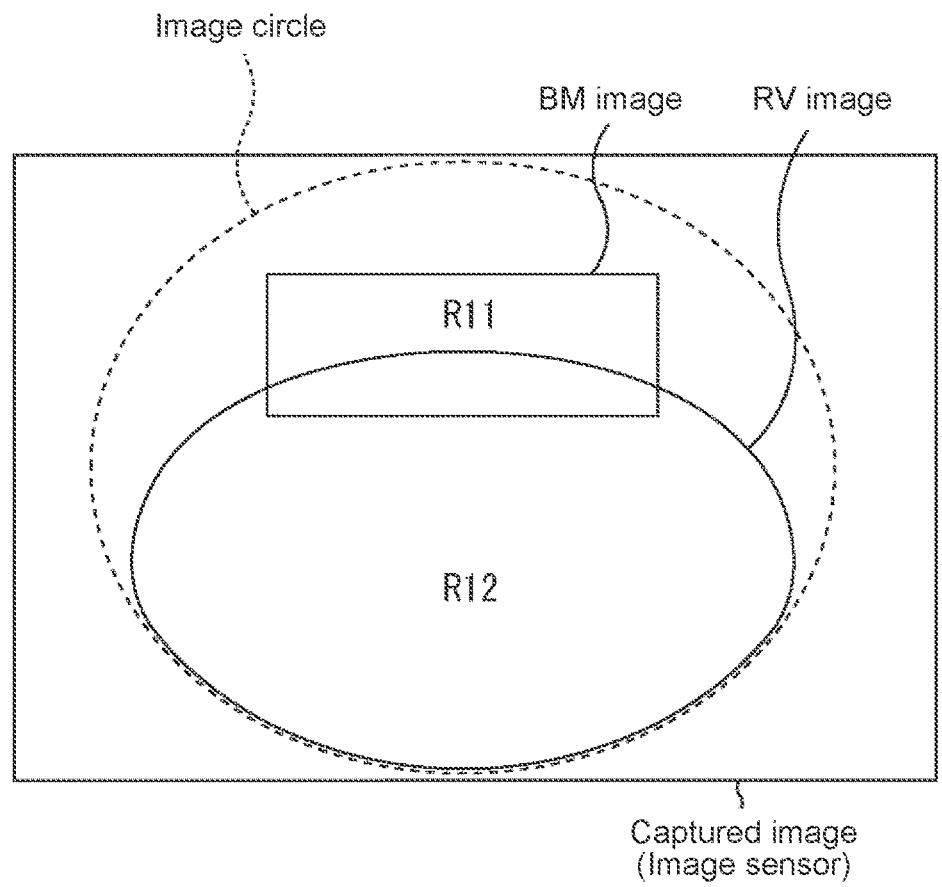
FIG. 4 is a diagram describing an example of a control of reading of a BM image and an RV image that are images read from a captured image, the control being performed by a controller 43.

FIG. 4 is a diagram describing an example of a control of reading of a BM image and an RV image that are images read from a captured image, the control being performed by the controller 43.

Regarding a positional relationship between the optical system 31 and a captured image captured by the image sensor 32, the captured image (a light-receiving surface of the image sensor 32) includes an image circle of (a lens included in) the optical system 31, as illustrated in, for example, FIG. 4.

In the reading control, the controller 43 controls reading of a pixel signal from the image sensor 32 such that a specified region R11 is extracted from a captured image as a BM image, the specified region R11 being a region in which a region situated further rearward than a region just behind the rear of the vehicle 10 appears (a region observed using an interior rearview mirror if the interior rearview mirror is installed in the vehicle 10). In other words, the controller 43 controls reading of a pixel signal from the image sensor 32 according to a display device or the type (/ an application) of image-display function.

Further, in the reading control, the controller 43 controls reading of a pixel signal from the image sensor 32 by supplying a reading position for a read image to the image sensor 32, such that a specified region R12 is extracted as an RV image from (an image in the image circle from among) the captured image, the specified region R12 being a region in which the rear of the vehicle 10 and the region just behind the rear of the vehicle 10 appear.

In accordance with control performed by the controller 43, the image sensor 32 reads, from a captured image obtained by performing image-capturing, a pixel signal of the region R11 that corresponds to (a pixel value of) the BM image, and outputs a read image that exhibits the pixel value corresponding to the pixel signal. Further, the image sensor 32 reads, from the captured image, a pixel signal of the region R12 that corresponds to the RV image, and outputs a read image that exhibits a pixel value corresponding to the pixel signal.

The regions R11 and R12 are each specified by a reading position for a read image that is supplied from the controller 43 to the image sensor 32.

Note that, in the control of reading of a BM image that is a read image, the controller 43 can also calculate a reading position according to, for example, positions of the line of sight and the head of a driver that are included in vehicle information, the reading position being used to specify the region R11 extracted as the BM image.

In other words, if a rearview mirror is installed in the vehicle 10, a range that appears in an image that can be seen by a driver using the rearview mirror will be changed as the driver moves his/her line of sight or his/her head. In the control of reading of a BM image that is a read image, the controller 43 can also calculate a reading position according to the positions of the line of sight and the head of the driver, such that the driver can see a BM image of a range similar to the range in an image that can be observed when the rearview mirror is installed in the vehicle 10, the reading position being used to specify the region R11 extracted as the BM image.

In order to simplify the description, the description of an RV image is omitted below.

<Relationship Between State of Vehicle 10 and BM Image>

Figure 5:
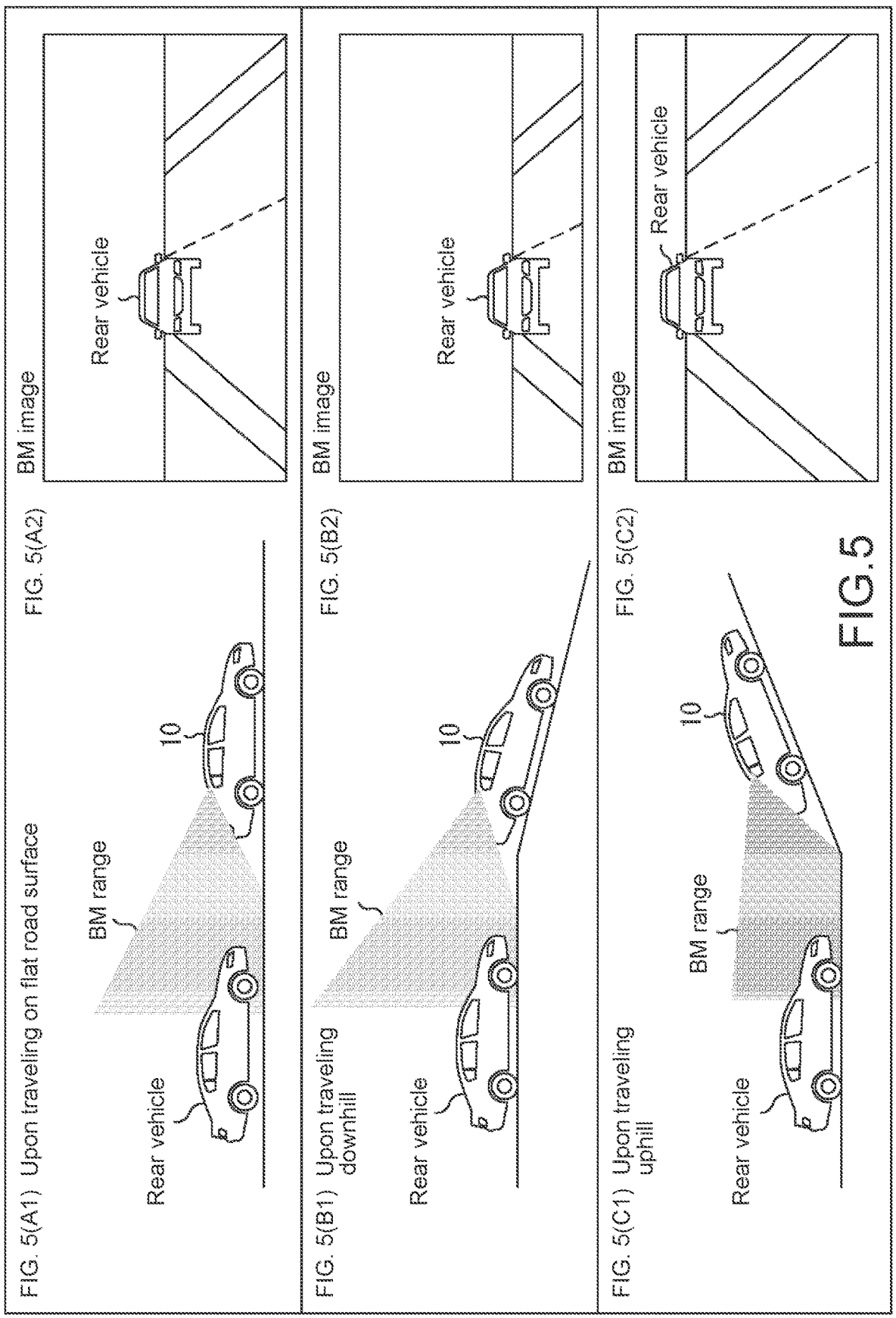
FIG. 5 is a diagram describing a first example of a relationship between a state of the vehicle 10 and a BM image.

FIG. 5 is a diagram describing a first example of a relationship between a state of the vehicle 10 and a BM image.

FIG. 5(A1) illustrates a state of the vehicle 10 when the vehicle 10 is traveling on a flat road surface. Further, FIG. 5(A2) illustrates an example of a BM image obtained when the vehicle 10 is traveling on the flat road surface.

FIG. 5(B1) illustrates a state of the vehicle 10 when the vehicle 10 starts traveling downhill. Further, FIG. 5(B2) illustrates an example of a BM image obtained when the vehicle 10 starts traveling downhill.

FIG. 5(C1) illustrates a state of the vehicle 10 when the vehicle 10 starts traveling uphill. Further, FIG. 5(C2) illustrates an example of a BM image obtained when the vehicle 10 starts traveling uphill.

Here, the range of a three-dimensional space in the BM image is referred to as a BM range. Further, in the following description, it is assumed that positions of the line of sight and the head of a driver are fixed in order to simplify the description. Therefore, it is assumed that (a position of) the region R11 extracted as a BM image from a captured image, and thus a BM range are not changed due to the driver moving the position of his/her line of sight or his/her head.

Further, it is assumed that, when the vehicle 10 is on a flat road surface (when the vehicle 10 is not inclined), the controller 43 performs a reading control, that is, a calculation of a reading position (a reading-start position and the size) such that a BM image in which a rear vehicle situated rearward a specified distance from the vehicle 10 appears substantially in the center of the view of the BM image is extracted, as illustrated in FIG. 5.

In this case, when the vehicle 10 starts traveling downhill, the vehicle 10 is inclined to the front, that is, in a pitch direction, and the optical axis of the camera unit 11 installed in the rear of the vehicle 10, and thus the BM range are upwardly inclined (toward the sky), compared to when the vehicle 10 is on a flat road surface (FIG. 5 (B1) and FIG. 5(B2)).

Consequently, when camera settings are performed such that a rear vehicle situated rearward a specified distance from the vehicle 10 appears substantially in the center of the view of a BM image in a state in which the vehicle 10 is on a flat road surface (the vehicle 10 is traveling on a flat road surface), a BM image in which the rear vehicle situated rearward the specified distance from the vehicle 10 appears in a lower portion of the view of the BM image, is obtained in a state in which the vehicle 10 starts traveling downhill. As illustrated in FIG. 5, the proportion of the sky (a region in which the sky appears) is larger and the proportion of a road is smaller in this BM image than a BM image obtained in a state in which the vehicle 10 is on a flat road surface.

Thus, an amount of information is changed in a BM image obtained when the vehicle 10 starts traveling downhill, compared to a BM image obtained when the vehicle is on a flat road surface. In other words, for example, an amount of information regarding a road is reduced in the BM image obtained when the vehicle 10 starts traveling downhill, compared to the BM image obtained when the vehicle 10 is on a flat road surface. Further, there is a possibility that, depending on a relative position of the vehicle 10 to a rear vehicle, or a state of the inclination of a downhill, a portion of the rear vehicle or the rear vehicle itself will not appear in a BM image.

On the other hand, when the vehicle 10 starts traveling uphill, the vehicle 10 is inclined to the back, that is, in the pitch direction, and the optical axis of the camera unit 11 installed in the rear of the vehicle 10, and thus the BM range are downwardly inclined (toward the road), compared to when the vehicle 10 is on a flat road surface (FIG. 5 (C1) and FIG. 5(C2)).

Consequently, when camera settings are performed such that a rear vehicle situated rearward a specified distance from the vehicle 10 appears substantially in the center of the view of a BM image in a state in which the vehicle 10 is on a flat road surface, a BM image in which the rear vehicle situated rearward the specified distance from the vehicle 10 appears in an upper portion of the view of the BM image, is obtained in a state in which the vehicle 10 starts traveling uphill. As illustrated in FIG. 5, the proportion of the sky (a region in which the sky appears) is smaller and the proportion of a road is larger in this BM image than a BM image obtained in a state in which the vehicle 10 is on a flat road surface.

Thus, an amount of information is changed in a BM image obtained when the vehicle 10 starts traveling uphill, compared to a BM image obtained when the vehicle 10 is on a flat road surface. In other words, for example, an amount of information regarding the sky is reduced in the BM image obtained when the vehicle 10 starts traveling uphill since the proportion of the sky is reduced, compared to the BM image obtained when the vehicle 10 is on a flat road surface. Further, there is a possibility that, depending on a relative position of the vehicle 10 to a rear vehicle, or a state of the inclination of an uphill, a portion of the rear vehicle or the rear vehicle itself will not appear in a BM image.

As described above, from the point of view of providing a driver of the vehicle 10 with a BM image suitable for the operation of the vehicle 10, it is not favorable that the amount of information in a BM image obtained when the vehicle 10 starts traveling downhill or uphill be changed from the amount of information in a BM image obtained when the vehicle 10 is on a flat road surface.

Thus, in the control of reading of a BM image, the controller 43 controls, according to inclination information from the detector 42, reading of a BM image corresponding to a read image from the image sensor 32, such that a BM image having an amount of information similar to that of a BM image obtained when the vehicle 10 is on a flat road surface, is obtained regardless of a state of the vehicle 10.

<Control of Reading of Read Image That is Performed by Controller 43 According to Inclination Information>

Figure 6:
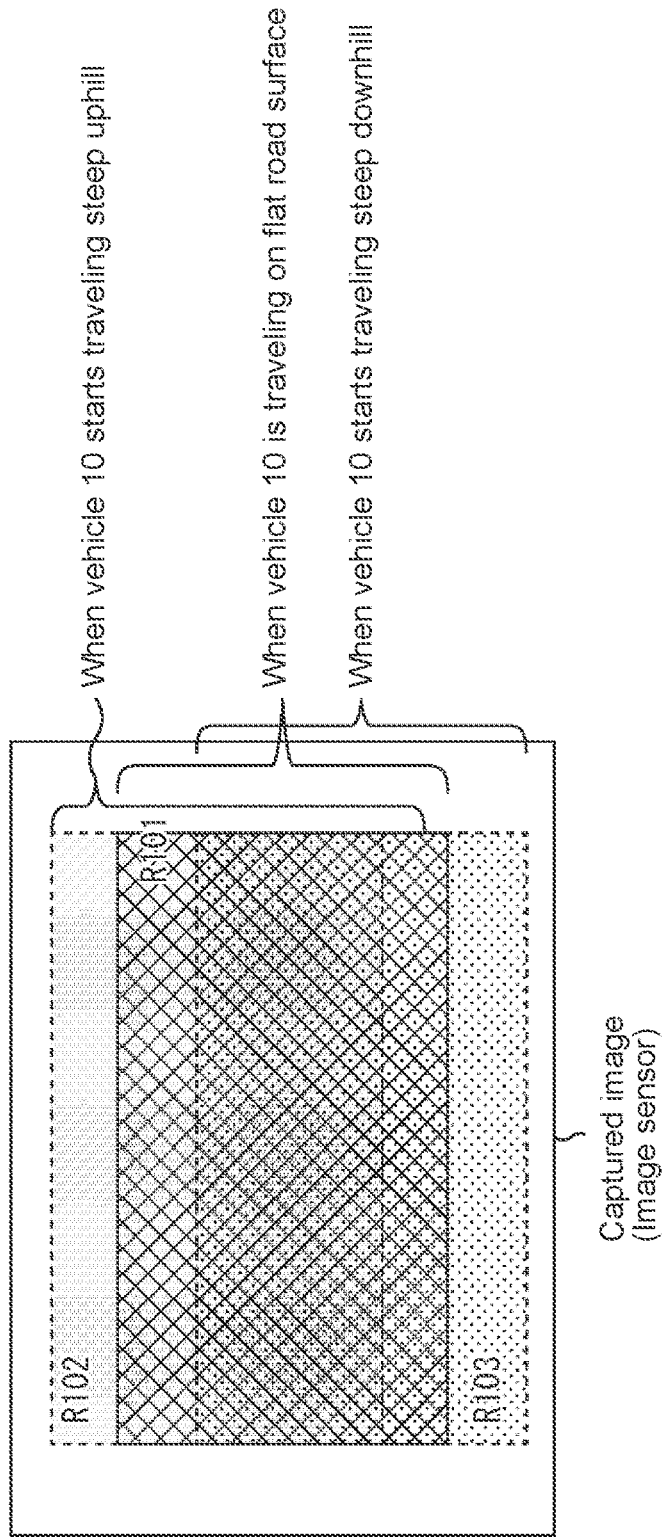
FIG. 6 is a diagram describing an example of a control of reading of a read image that is performed by the controller 43 according to inclination information.

FIG. 6 is a diagram describing an example of a control of reading of a read image that is performed by the controller 43 according to inclination information.

Here, it is assumed that, when the vehicle is on a flat road surface, a reading control is performed by the controller 43 such that (a pixel signal of a pixel of) a rectangular region R101 is read from a captured image captured by the image sensor 32 (from the light-receiving surface of the image sensor 32). The region R101 has the same size as a BM image that is a read image.

For example, when the vehicle 10 starts traveling uphill and is inclined to the back, the controller 43 performs a reading control such that a reading position used to specify a region R102 having the same size as the region R101 is calculated according to inclination information, and a pixel signal of the calculated reading position is read, the region R102 being shifted upward from the region R101 by the number of pixels corresponding to an angle at which the vehicle 10 is inclined to the back.

Further, for example, when the vehicle 10 starts traveling downhill and is inclined to the front, the controller 43 performs a reading control such that a reading position used to specify a region R103 having the same size as the region R101 is calculated according to inclination information, and a pixel signal of the calculated reading position is read, the region R103 being shifted downward from the region R101 by the number of pixels corresponding to an angle at which the vehicle 10 is inclined to the front.

In the calculation of a reading position depending on inclination information, the reading position is calculated such that a read image in which a road and the sky appear in the same proportion as a BM image obtained when the vehicle 10 is on a flat road surface, is read, that is, such that the proportion between a road and the sky that appear in a read image is maintained the same as (/ is close to) the proportion in a BM image obtained when the vehicle 10 is on a flat road surface.

It is possible to easily obtain an image suitable for the operation of the vehicle 10 by the reading control described above being performed by the controller 43. In other words, it is possible to easily obtain a BM image having an amount of information similar to that of a BM image obtained when the vehicle 10 is on a flat road surface, regardless of the inclination of the vehicle 10 in the pitch direction.

In the first example of the configuration of the viewing system, the detector 42 detects a (steep) hill from, for example, gyroscopic information, or GPS information and a 3D map that are vehicle information supplied by the acquisition section 41, and detects (calculates) inclination information regarding the vehicle when the vehicle 10 starts going up or down a hill, that is, inclination information that primarily indicates (the level of) the inclinations of the vehicle 10 to the front and to the back, that is, in the pitch direction. Then, the detector 42 supplies the inclination information to the controller 43.

For example, the detector 42 can detect, using the gyroscopic information, that the vehicle 10 starts going up or down a hill, and can further detect inclination information that indicates the inclinations of the vehicle 10 to the front and to the back, that is, in the pitch direction at that time.

Further, for example, the detector 42 detects (estimates), from the current location obtained using the GPS information and from the 3D map, that the vehicle 10 starts going up or down a hill, and can further detect (estimate), using an inclination of the hill that is obtained using the 3D map, inclination information that indicates the inclinations of the vehicle 10 to the front and to the back, that is, in the pitch direction when the vehicle 10 starts going up or down the hill.

According to the inclination information from the detector 42, the controller 43 calculates a reading position for an image read from the image sensor 32 as a read image, and supplies the calculated reading position to the image sensor 32. Accordingly, the controller 43 controls reading of the read image from the image sensor 32.

The image sensor 32 reads a pixel signal of a pixel of the reading position supplied from the controller 43, and outputs a read image that exhibits a pixel value corresponding to the pixel signal.

Example of Configuration of Image Sensor 32

Figure 7:
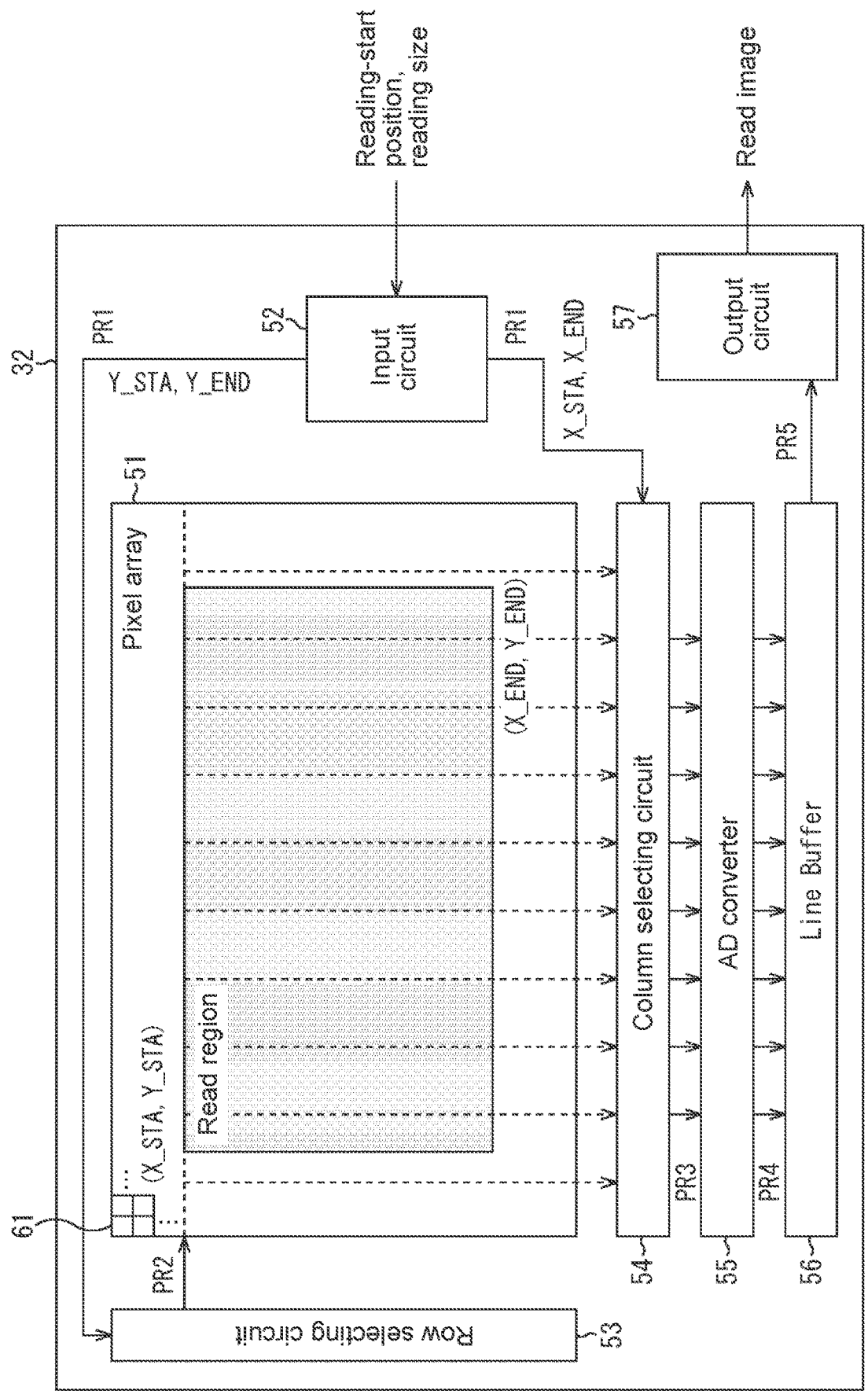
FIG. 7 illustrates an example of a configuration of an image sensor 32.

FIG. 7 illustrates an example of a configuration of the image sensor 32 of FIG. 3.

The image sensor 32 includes a pixel array 51, an input circuit 52, a row selecting circuit 53, a column selecting circuit 54, an analog-to-digital (AD) converter 55, a line buffer 56, and an output circuit 57.

The pixel array 51 includes a plurality of pixels 61 arranged in a two-dimensional plane. A region, in the pixel array 51, in which the pixels 61 are arranged is the light-receiving surface of the image sensor 32.

The pixel 61 converts light entering the pixel 61 into a pixel signal that is an electrical signal corresponding to the amount of the light. A pixel signal of the pixel 61 in a row selected by the row selecting circuit and in a column selected by the column selecting circuit is read from the pixel array 51 through the column selecting circuit 54, and the read pixel signal is supplied to the AD converter 55.

A reading position specified by a reading-start position for a read image read from a captured image and by the size of the read image (hereinafter also referred to as a reading size) is supplied by the controller 43 to the input circuit 52.

Using the reading-start position and the reading size that are the reading position from the controller 43, the input circuit 52 calculates coordinates of the pixel 61 from among the pixels 61 of the pixel array that are reading-start coordinates (X_STA, Y_STA), and calculates coordinates of the pixel 61 from among the pixels 61 of the pixel array 51 that are reading-termination coordinates (X_END, Y_END), the pixel 61 for the reading-start coordinates (X_STA, Y_STA) being the pixel 61 at which reading of a pixel signal is started in, for example, raster scan order, the pixel 61 for the reading-termination coordinates (X_END, Y_END) being the pixel 61 at which reading of a pixel signal is terminated in, for example, raster scan order.

The input circuit 52 supplies a y-coordinate Y_STA of the reading-start coordinates (X_STA, Y_STA), and a y-coordinate Y_END of the reading-termination coordinates (X_END, Y_END) to the row selecting circuit 53, and the input circuit 52 supplies an x-coordinate X_STA of the reading-start coordinates (X_STA, Y_STA) and an x-coordinate X_END of the reading-termination coordinates (X_END, Y_END) to the column selecting circuit 54 (a process PR1).

The row selecting circuit 53 sequentially selects rows from a row of the pixel 61 represented by the y-coordinate Y_STA received from the input circuit 52 up to a row of the pixel 61 represented by the y-coordinate Y_END received from the input circuit 52 (a process PR2).

In the pixel array 51, a pixel signal is read from the pixel 61 in the row selected by the row selecting circuit 53, and the read pixel signal is supplied to the column selecting circuit 54.

From among the pixel signals read from the pixels 61, the column selecting circuit 54 selects pixel signals of the pixels 61 in respective columns from a column of the pixel 61 represented by the x-coordinate X_STA received from the input circuit 52 up to a column of the pixel 61 represented by the x-coordinate X_END received from the input circuit 52, and the column selecting circuit supplies the selected pixel signals to the AD converter (a process PR3).

The AD converter 55 performs AD conversion on a pixel signal from the column selecting circuit 54, for example, per row, and supplies, to the line buffer 56, the pixel signal on which AD conversion has been performed (a process PR4).

The line buffer 56 temporarily stores therein a pixel signal from the AD converter 55.

The output circuit 57 reads a pixel signal stored in the line buffer 56 for each pixel (a process PR5), and outputs the read pixel signal to the outside of the image sensor 32 as a pixel value of the read image.

As described above, in the image sensor 32, a pixel signal of the pixel 61 included in a read region is read, and an image that exhibits a pixel value corresponding to the pixel signal is read as a read image, the read region being a rectangular region that includes the pixel 61 of the reading-start coordinates (X_STA, Y_STA) as an upper-left vertex and the pixel 61 of the reading-termination coordinates (X_END, Y_END) as a lower-right vertex.

<Display Processing>

Figure 8:
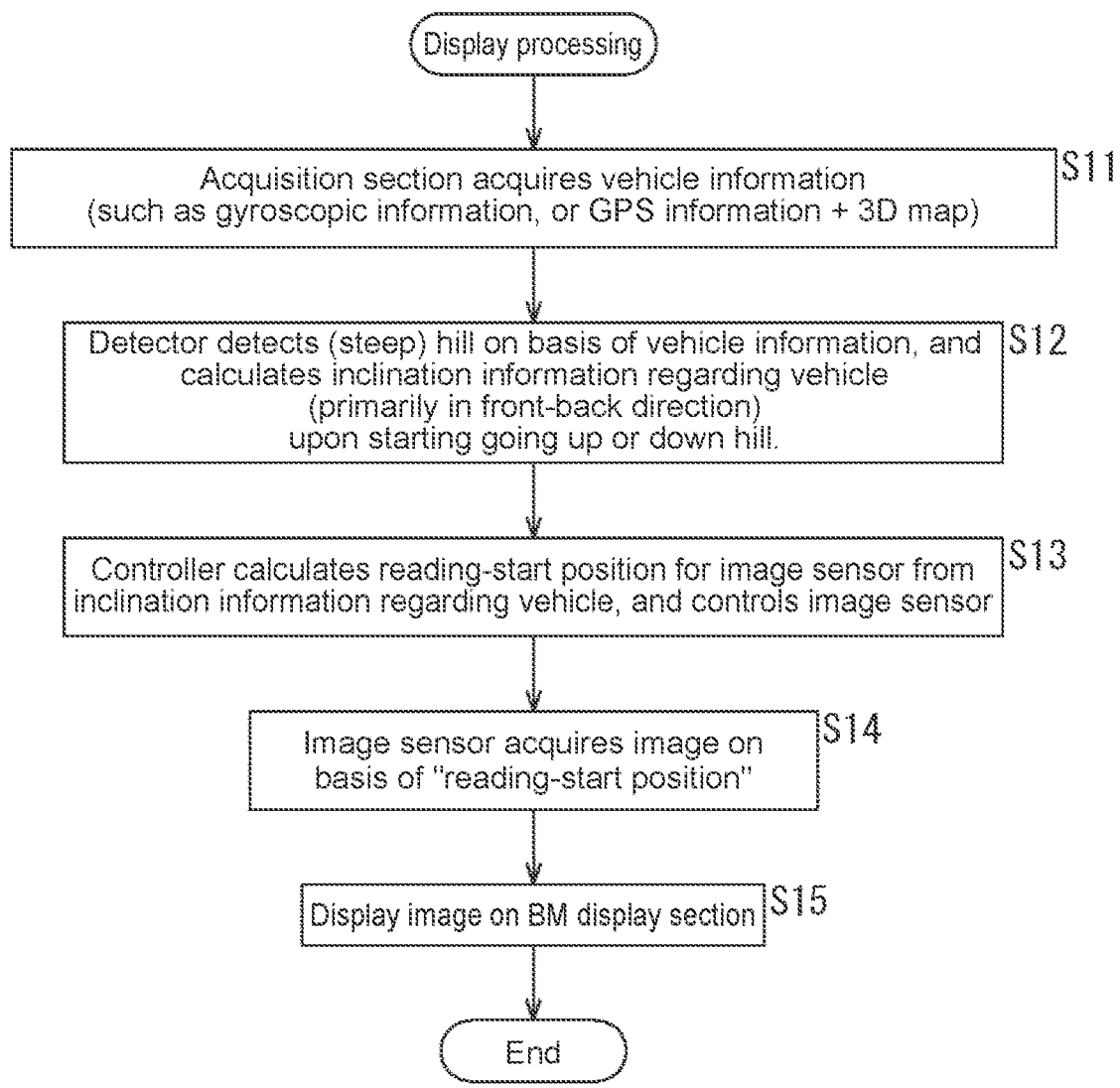
FIG. 8 is a flowchart describing an example of display processing of displaying a BM image that is performed in the first example of the configuration of the viewing system.

FIG. 8 is a flowchart describing an example of display processing of displaying a BM image that is performed in the first example of the configuration of the viewing system of FIG. 3.

In Step S11, the acquisition section 41 acquires gyroscopic information, or GPS information and a 3D map as vehicle information, and supplies the vehicle information to the detector 42. Then, the process moves on to Step S12.

In Step S12, the detector 42 detects a hill using the vehicle information from the acquisition section 41. Further, the detector 42 detects (calculates), using the vehicle information from the acquisition section 41, inclination information regarding the vehicle 10 when the vehicle 10 starts going up or down the hill (primarily, inclination information indicating the inclinations to the front and to the back, that is, in the pitch direction), and supplies the detected inclination information to the controller 43. Then, the process moves on to Step S13 from Step S12.

In Step S13, the controller 43 calculates, according to the inclination information from the detector 42, a reading-start position for a read image from the image sensor 32, and supplies the reading-start position and the size of a BM image to the image sensor 32 as a reading position. Then, the process moves on to Step S14.

In Step S14, the image sensor 32 reads a pixel signal of a pixel of the reading position supplied by the controller 43, and acquires a read image that exhibits a pixel value corresponding to the pixel signal to output the acquired read image. The read image output by the image sensor 32 is supplied to the output section 33, and the process moves on to Step S15 from Step S14.

In Step S15, the output section 33 transmits, to the BM display section 21 and as a BM image, the read image from the image sensor 32, and causes the read image to be displayed on the BM display section 21. This results in the BM image being displayed on the BM display section 21, and the displaying processing is terminated.

As described above, in the first example of the configuration of the viewing system, inclination information is detected that primarily indicates the inclinations to the front and to the back, that is, in the pitch direction, and reading of a read image from the image sensor 32 is controlled according to the inclination information. Thus, it is possible to easily provide an image suitable for the operation of the vehicle 10. In other words, a BM image having an amount of information similar to that of a BM image obtained when the vehicle 10 is on a flat road surface, can be easily provided when the vehicle 10 starts going up or down a hill.

Further, in the first example of the configuration of the viewing system, a read image having the same size as a BM image is read from the image sensor in the reading control. Thus, it is possible to reduce the possibility of reducing the frame rate of the BM image, compared to when an image larger in size than the BM image is read from the image sensor 32.

Gyroscopic information as well as GPS information and a 3D map have been described as examples of the vehicle information in the first configuration example. However, as in a second configuration example or a third configuration example described later, suspension information, a front camera image, or the like may be used as the vehicle information in the first configuration example. The inclination of the vehicle may be detected using the suspension information, the front camera image, or the like.

Second Example of Configuration of Viewing System

Figure 9:
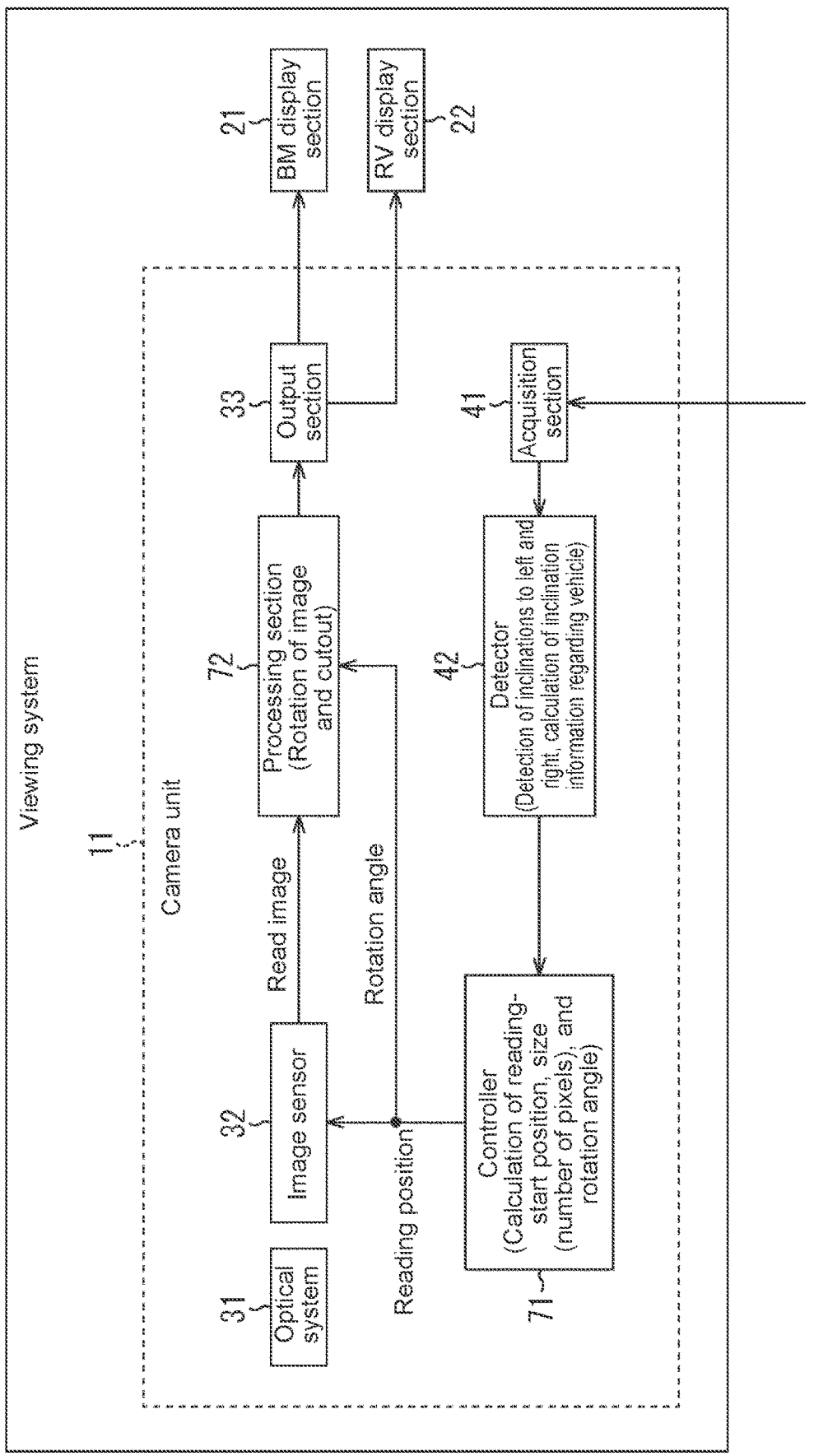
FIG. 9 is a block diagram illustrating a second example of the configuration of the viewing system included in the vehicle 10.

FIG. 9 is a block diagram illustrating the second example of the configuration of the viewing system included in the vehicle 10.

Note that, in the figure, a portion corresponding to that in FIG. 3 is denoted by the same reference numeral as FIG. 3, and a description thereof is omitted below.

In FIG. 9, the viewing system includes the camera unit 11, the BM display section 21, and the RV display section 22. Further, the camera unit 11 in FIG. 9 includes the optical system 31, the image sensor 32, the output section 33, the acquisition section 41, the detector 42, a controller 71, and a processing section 72.

Thus, the second example of the configuration of the viewing system of FIG. 9 is similar to the configuration of the viewing system of FIG. 3 in including the camera unit 11, the BM display section 21, and the RV display section 22.

However, the second example of the configuration of the viewing system of FIG. 9 is different from the configuration of the viewing system of FIG. 3 in that the camera unit 11 includes the controller 71 instead of the controller 43, and newly includes the processing section 72.

As in the case of the controller 43, the controller 71 controls reading of a read image from the image sensor 32 according to inclination information supplied by the detector 42.

However, according to the inclination information supplied by the detector 42, the controller 71 calculates a reading-start position for and the reading size of a read image from a captured image captured by the image sensor 32, and the controller 71 supplies a reading position specified by the reading-start position and the reading size to the image sensor 32.

In other words, in the first example of the configuration of the viewing system, the reading size is set to the size of a BM image since the size of a read image is the same as the size of the BM image. On the other hand, in the second example of the configuration of the viewing system, the reading size is calculated according to inclination information.

Here, in the second example of the configuration of the viewing system, the acquisition section 41 acquires, for example, suspension information as vehicle information, and supplies the acquired vehicle information to the detector 42.

In this case, the detector 42 detects the inclination to the left and to the right, that is, in a roll direction using the suspension information from the acquisition section 41, and detects (calculates) inclination information that indicates (the level of) the inclination. Then, the detector 42 supplies the inclination information to the controller 71.

According to the inclination information from the detector 42, the controller 71 calculates a rotation angle used to rotate the read image output by the image sensor 32, and supplies the calculated rotation angle to the processing section 72. The controller 71 supplies the rotation angle to the processing section 72 as described above to control a rotation of a read image that is performed by the processing section 72, such that the read image is rotated by the rotation angle.

The read image output by the image sensor 32 is supplied to the processing section 72.

The processing section 72 rotates the read image according to the rotation angle from the controller 71. Further, the processing section 72 cuts an image having a size of a BM image (hereinafter also referred to as a BM size) out of the rotated read image, and supplies the obtained image to the output section 33 as the BM image.

As described above, in the processing section 72, a read image is rotated and an image having a BM size is cut out of the rotated read image. Thus, it is necessary that the read image be an image having a size in which an image having a BM size can be cut out of the read image after rotation.

Thus, for example, the controller 71 calculates, as a reading size and according to inclination information, a smallest size of a read image such that an image having a BM size can be cut out of the read image after rotation.

<Relationship Between State of Vehicle 10 and BM Image>

FIG. 10 is a diagram describing a second example of a relationship between a state of the vehicle 10 and a BM image.

FIG. 10(A1) illustrates a state of the vehicle 10 when the vehicle 10 is traveling on a flat road surface. Further, FIG. 10(A2) illustrates an example of a BM image obtained when the vehicle 10 is traveling on the flat road surface.

FIG. 10(B1) illustrates a state of the vehicle 10 when the vehicle 10 is on a road surface that has a difference in level and of which the right side is higher than its left side in a direction in which a front side of the vehicle 10 is oriented. Further, FIG. 10(B2) illustrates an example of a BM image obtained when the vehicle 10 is on the road surface that has a difference in level and of which the right side is higher than its left side in the direction in which the front side of the vehicle 10 is oriented.

FIG. 10(C1) illustrates a state of the vehicle 10 when the vehicle 10 is on a road surface that has a difference in level and of which the left side is higher than its right side in the direction in which the front side of the vehicle 10 is oriented. Further, FIG. 10(C2) illustrates an example of a BM image obtained when the vehicle 10 is on the road surface that has a difference in level and of which the left side is higher than its right side in the direction in which the front side of the vehicle 10 is oriented.

It is assumed that, in FIG. 10, the region R11 extracted from a captured image as a BM image is not changed due to a driver moving a position of his/her line of sight or his/her head, as in the case of FIG. 5.

In this case, when the vehicle 10 is on a road surface that has a difference in level and of which the right side is higher than its left side in the direction in which the front side of the vehicle 10 is oriented, the vehicle 10 is inclined to the left, that is, in the roll direction, and the camera unit 11 installed in the rear of the vehicle 10 is also inclined in the roll direction.

Consequently, when the vehicle 10 is on a flat road surface (FIG. 10(A)), a horizontal line that extends horizontally appears in a BM image. When the vehicle 10 is on a road surface that has a difference in level and of which the right side is higher, a BM image in which the horizontal line appears in a state of being inclined diagonally downward right (diagonally upward left) is obtained (FIG. 10(B)). As illustrated in FIG. 10, there is a change in ranges of the sky and a road that appear in this BM image, compared to the BM image obtained when the vehicle 10 is on a flat road surface. In other words, in the BM image (FIG. 10(B)) obtained when the vehicle 10 is on a road surface that has a difference in level and of which the right side is higher, the proportion of the road on the right is smaller and the proportion of the sky on the right is larger, and the proportion of the road on the left is larger and the proportion of the sky on the left is smaller, compared to the BM image obtained when the vehicle is on a flat road surface.

Thus, there is a change in content of the BM image obtained when the vehicle 10 is on a road surface that has a difference in level and of which the right side is higher, compared to the BM image obtained when the vehicle 10 is on a flat road surface.

On the other hand, when the vehicle 10 is on a road surface that has a difference in level and of which the left side is higher than its right side in the direction in which the front side of the vehicle 10 is oriented, the vehicle 10 is inclined to the right, that is, in the roll direction, and the camera unit 11 installed in the rear of the vehicle 10 is also inclined in the roll direction.

Consequently, when the vehicle 10 is on a road surface that has a difference in level and of which the left side is higher, a BM image in which the horizontal line appears in a state of being inclined diagonally upward right (diagonally downward left) is obtained (FIG. 10(C)). As illustrated in FIG. 10, there is a change in ranges of the sky and a road that appear in this BM image, compared to the BM image obtained when the vehicle 10 is on a flat road surface. In other words, in the BM image (FIG. 10(C)) obtained when the vehicle 10 is on a road surface that has a difference in level and of which the left side is higher, the proportion of the road on the right is larger and the proportion of the sky on the right is smaller, and the proportion of the road on the left is smaller and the proportion of the sky on the left is larger, compared to the BM image obtained when the vehicle 10 is on a flat road surface.

Thus, there is a change in content of the BM image obtained when the vehicle 10 is on a road surface that has a difference in level and of which the left side is higher, compared to the BM image obtained when the vehicle 10 is on a flat road surface.

As described above, from the point of view of providing a driver of the vehicle 10 with a BM image suitable for the operation of the vehicle 10, it is not favorable that there be a change in BM image from a BM image obtained when the vehicle 10 is on a flat road surface to a BM image obtained when the vehicle 10 is on a road surface that has a difference in level and of which the left side or the right side is higher.

Thus, in the control of reading of a BM image, the controller 71 controls, according to inclination information from the detector 42, reading of a BM image corresponding to a read image from the image sensor 32, such that a BM image having an amount of information similar to that of a BM image obtained when the vehicle 10 is on a flat road surface, is obtained regardless of a state of the vehicle 10.

<Control of Reading of Read Image That is Performed by Controller 71 According to Inclination Information>0126

FIG. 11 is a diagram describing an example of a control of reading of a read image that is performed by the controller 71 according to inclination information.

Figure 11A:
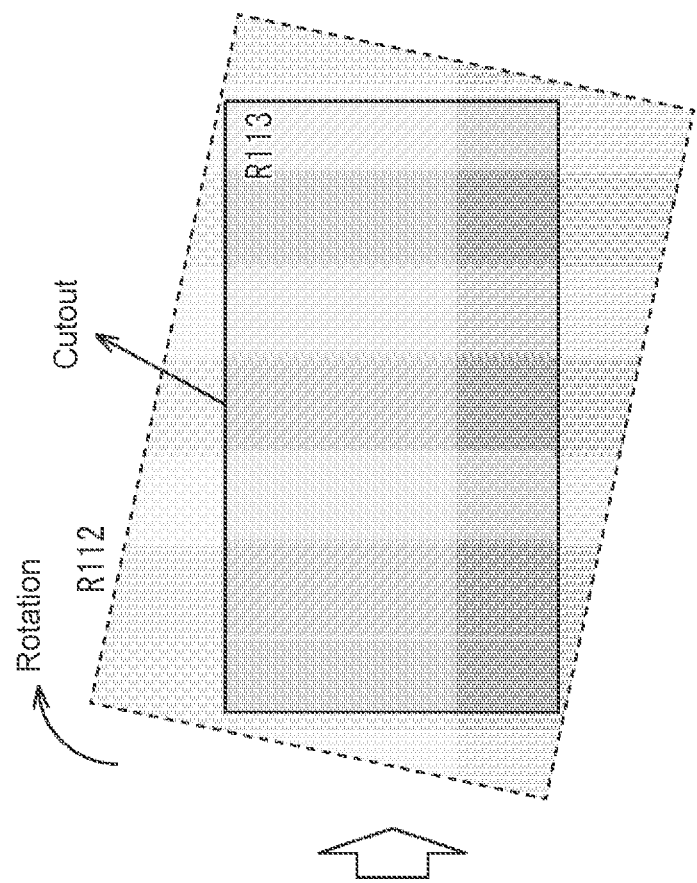
FIG. 11 is a diagram describing an example of a control of reading of a read image that is performed by a controller 71 according to inclination information.
Figure 11B:
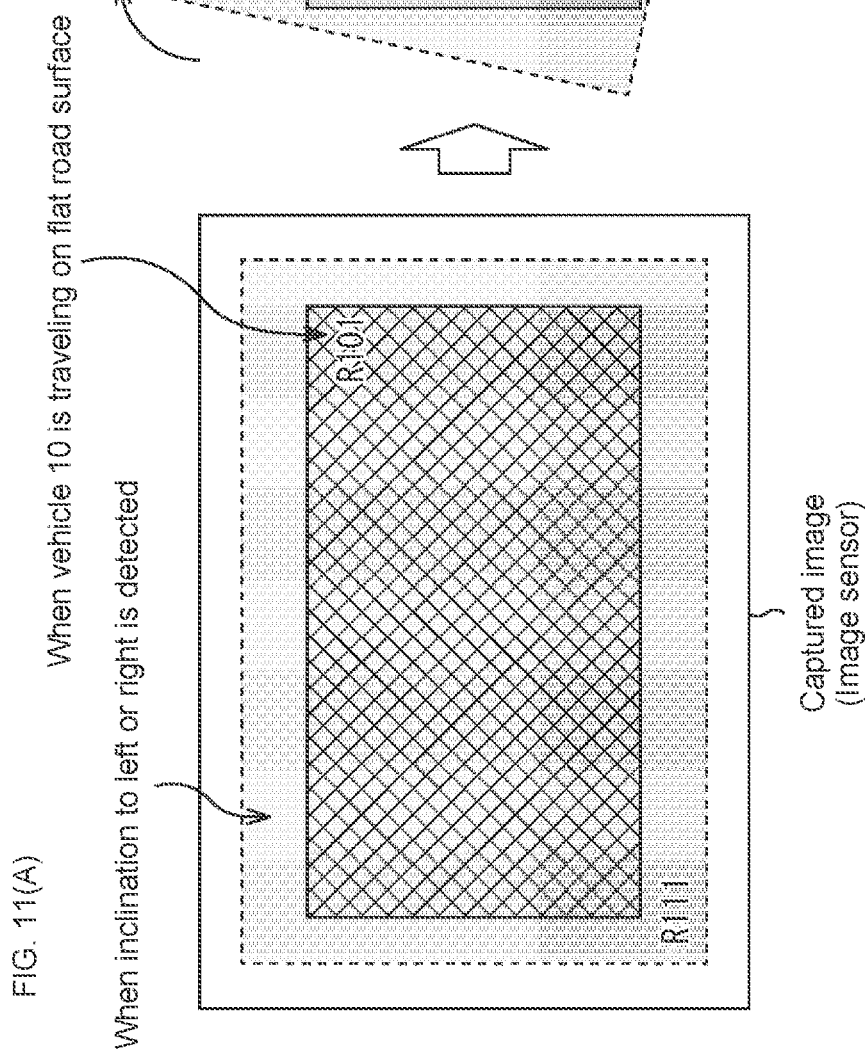

FIG. 11(A) on the left illustrates read regions on the image sensor 32 with respect to respective cases. FIG. 11(B) on the right illustrates a region cut out by the processing section 72.

As described with reference to FIG. 6, it is assumed that, when the vehicle 10 is on a flat road surface, a reading control is performed by the controller 71 such that (a pixel signal of a pixel of) the rectangular region R101 having the same size as a BM image is read from a captured image captured by the image sensor 32 (from the light-receiving surface of the image sensor 32).

For example, when the vehicle 10 is on a road surface having a difference in level and is inclined in the roll direction, the controller 71 performs a reading control such that a reading position used to specify a region R111 that is larger in size than the region R101 by the number of pixels corresponding to an angle of the inclination of the vehicle 10 in the roll direction, is calculated according to inclination information, and a pixel signal of the calculated reading position is read.

Here, as illustrated in FIG. 10, the horizontal line that appears to extend horizontally in a BM image obtained when the vehicle 10 is on a flat road surface, is inclined in a BM image obtained when the vehicle 10 is inclined in the roll direction.

Thus, a read image output by the image sensor 32 according to a reading control is rotated by the processing section 72 such that the horizontal line appearing in the read image extends horizontally, and (an image that corresponds to) the BM image is cut out of the rotated read image.

For example, in the calculation of a reading position depending on inclination information, a reading-start position and a reading size that are a reading position used to specify the region R111 being centered at the center (the center of gravity) of the region R101 and having a smallest size such that a BM image can be cut out of a read image after rotation, are calculated by the controller 71, and the calculated reading-start position and reading size are supplied to the image sensor 32.

Further, for example, a rotation angle used to rotate the region R111 corresponding to a read image output by the image sensor 32 is calculated by the controller 71 according to inclination information, such that the horizontal line appearing in the region R111 corresponding to the read image, appears to extend horizontally, and the calculated rotation angle is supplied by the controller 71 to the processing section 72.

The rectangular region R111 specified by the reading-start position and the reading size that are the reading position from the controller 71 is read by the image sensor 32 as a read image, and is supplied by the image sensor 32 to the processing section 72.

The region R111 that is the read image from the image sensor 32 is rotated by the processing section 72 by the rotation angle from the controller 71. Then, a region R113 that has the same size as the BM image and of which the angle of rotation is 0 degrees, is cut out of a region R112 by the processing section 72 as the BM image, the region R112 being obtained by rotating the region R111 (FIG. 11(B)).

With respect to a read image of FIG. 11(A), the vehicle 10 is inclined to the right, that is, in the roll direction, and thus the horizontal line appearing in the read image is inclined diagonally upward right. Thus, the region R111 that is the read image is rotated clockwise by the processing section 72 such that the horizontal line inclined diagonally upward right extends horizontally, and the region R113 that is a BM image is cut out of the region R112 by the processing section 72, the region R112 being obtained by the rotation.

Accordingly, it is possible to easily obtain, as a BM image, an image suitable for the operation of the vehicle 10. In other words, it is possible to easily obtain a BM image having an amount of information similar to that of a BM image obtained when the vehicle 10 is on a flat road surface, regardless of the inclination of the vehicle in the roll direction.

FIG. 12 is a diagram further describing an example of the control of reading of a read image that is performed by the controller 71 according to inclination information.

FIG. 12(A) is a diagram describing the fact that the reading size of a read image obtained when the vehicle 10 is inclined in the roll direction is larger than the size of a BM image. FIG. 12(B) is a diagram describing a rotation performed by the processing section 72. FIG. 12(C) is a diagram describing a cutout of the BM image that is performed by the processing section 72.

In FIG. 12(A), the vehicle 10 is inclined to the right, that is, in the roll direction, and thus the horizontal line appearing in the read image is inclined diagonally upward right.

In the second example of the configuration of the viewing system, the detector 42 detects, from suspension information that is vehicle information and is supplied by the acquisition section 41, that the vehicle 10 is inclined in the roll direction, and detects (calculates) inclination information that indicates the inclination of the vehicle 10, that is, inclination information that primarily indicates (the level of) the inclinations of the vehicle 10 to the left and to the right, that is, in the roll direction. Then, the detector 42 supplies the inclination information to the controller 71.

According to the inclination information from the detector 42, the controller 71 calculates a reading-start position for and the reading size of the region R111 represented by a reading position for a read image read from the image sensor 32, and the controller 71 supplies the calculated reading-start position and reading size to the image sensor 32. When the vehicle 10 is inclined in the roll direction (when the angle of inclination in the roll direction is other than 0 degrees), the reading size is larger than the size of the region R101 having the same size as the BM image.

Further, according to the inclination information from the detector 42, the controller 71 calculates a rotation angle used to rotate the region R111 that is the read image, and supplies the calculated rotation angle to the processing section 72.

The image sensor 32 reads, as a read image, the region R111 represented by the reading position (the reading-start position and the reading size) from the controller 71, and outputs the read image.

The region R111 that is the read image output by the image sensor 32 is supplied to the processing section 72.

The region R111 is rotated by the processing section 72 by the rotation angle from the controller 71, and this results in generating the region R112 in which the horizontal line appears to extend horizontally (FIG. 12(B)). Further, the region R113 having the same size as the region R101 is cut out of the region R112 by the processing section 72 as a BM image (FIG. 12(B) and FIG. 12(C)).

<Display Processing>

Figure 13:
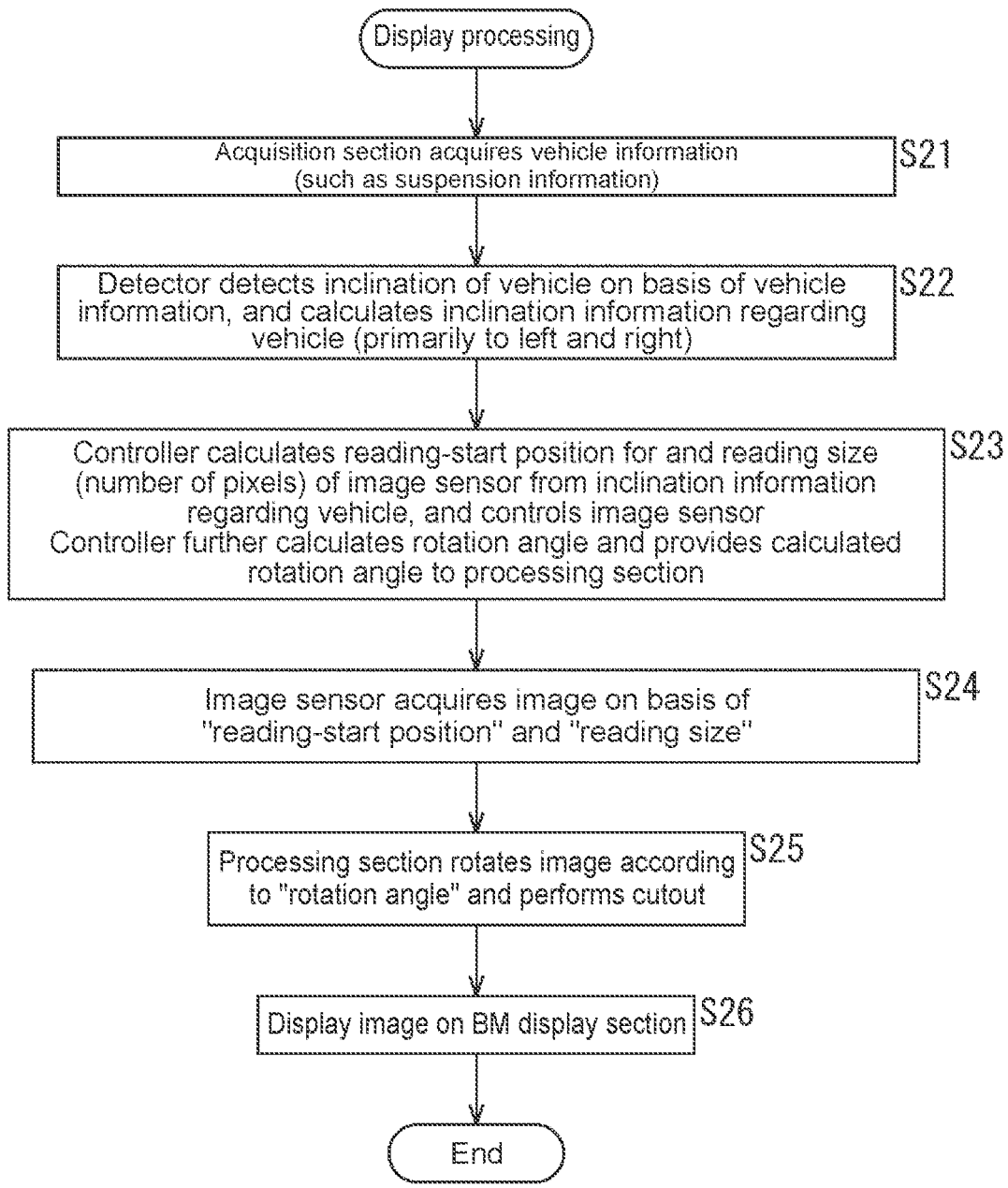
FIG. 13 is a flowchart describing an example of display processing of displaying a BM image that is performed in the second example of the configuration of the viewing system.

FIG. 13 is a flowchart describing an example of display processing of displaying a BM image that is performed in the second example of the configuration of the viewing system of FIG. 9.

In Step S21, the acquisition section 41 acquires suspension information as vehicle information, and supplies the vehicle information to the detector 42. Then, the process moves on to Step S22.

In Step S22, the detector 42 detects the inclination of the vehicle 10 in the roll direction using the vehicle information from the acquisition section 41. Further, the detector 42 detects (calculates), using the vehicle information from the acquisition section 41, inclination information regarding the vehicle 10 when the vehicle 10 is inclined in the roll direction (primarily, inclination information indicating the inclinations to the left and to the right, that is, in the roll direction), and supplies the detected inclination information to the controller 71. Then, the process moves on to Step S23 from Step S22.

In Step S23, the controller 71 calculates, according to the inclination information from the detector 42, a reading-start position for and the reading size of a read image from the image sensor 32, and supplies the reading-start position and the reading size to the image sensor 32 as a reading position. Further, the controller 71 calculates, according to the inclination information from the detector 42, a rotation angle used to rotate the read image, and supplies the calculated rotation angle to the processing section 72. Then, the process moves on to Step S24 from Step S23.

In Step S24, the image sensor 32 reads a pixel signal of a pixel of the reading position supplied by the controller 71, and acquires a read image that exhibits a pixel value corresponding to the pixel signal to output the acquired read image. The read image output by the image sensor 32 is supplied to the processing section 72, and the process moves on to Step S25 from Step S24.

In Step S25, the processing section 72 rotates the read image from the image sensor 32 by the rotation angle from the controller 71. Further, the processing section 72 cuts a BM image out of the rotated read image, and supplies the BM image to the output section 33. Then, the process moves on to Step S26 from Step S25.

In Step S26, the output section 33 transmits, to the BM display section 21, the BM image from the processing section 72, and causes the BM image to be displayed on the BM display section 21. This results in the BM image being displayed on the BM display section 21, and the displaying processing is terminated.

As described above, in the second example of the configuration of the viewing system, inclination information is detected that primarily indicates the inclinations to the left and to the right, that is, in the roll direction, and reading of a read image from the image sensor 32 is controlled according to the inclination information. Further, in the second example of the configuration of the viewing system, a rotation of the read image is controlled according to the inclination information, and a BM image is cut out of the read image after the rotation. Thus, the second example of the configuration of the viewing system makes it possible to easily provide an image suitable for the operation of the vehicle 10. In other words, a BM image having an amount of information similar to that of a BM image obtained when the vehicle 10 is on a flat road surface, can be easily provided when the vehicle 10 is on a road surface having a difference in level between the left side and the right side.

Further, in the second example of the configuration of the viewing system, a read image having a smallest size such that a BM image can be cut out of the read image after rotation, is read from the image sensor 32 in the reading control. This makes it possible to reduce the possibility of reducing the frame rate of the BM image.

The suspension information has been described as an example of the vehicle information in the second configuration example. However, the gyroscopic information; the GPS information and the 3D map; the front camera image; or the like may be used as the vehicle information, as in the first configuration example described above, or in the third configuration example described later. Then, the inclination of the vehicle may be detected using the gyroscopic information; the GPS information and the 3D map; the front camera image; or the like.

Third Example of Configuration of Viewing System

Figure 14:
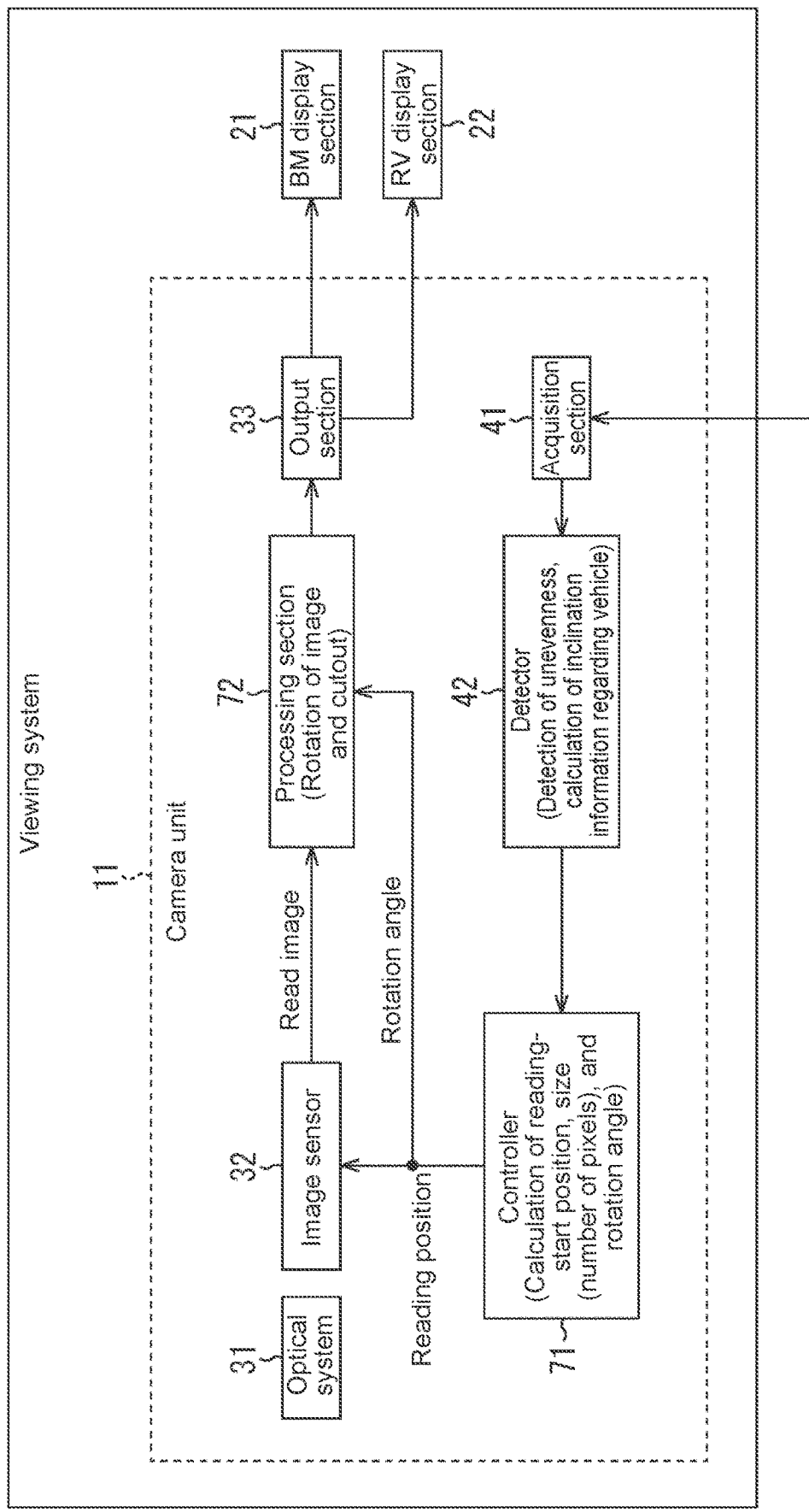
FIG. 14 is a block diagram illustrating a third example of the configuration of the viewing system included in the vehicle 10.

FIG. 14 is a block diagram illustrating the third example of the configuration of the viewing system included in the vehicle 10.

Note that, in the figure, a portion corresponding to that in FIG. 3 or 9 is denoted by the same reference numeral as FIG. 3 or 9, and a description thereof is omitted below.

In FIG. 14, the viewing system includes the camera unit 11, the BM display section 21, and the RV display section 22. Further, the camera unit 11 in FIG. 14 includes the optical system 31, the image sensor 32, the output section 33, the acquisition section 41, the detector 42, the controller 71, and the processing section 72.

Thus, the third example of the configuration of the viewing system of FIG. 14 is similar to the second example of the configuration of the viewing system of FIG.

However, in the third example of the configuration of the viewing system of FIG. 14, the acquisition section 41 acquires, for example, suspension information or a front camera image as vehicle information, and supplies the acquired vehicle information to the detector 42.

In this case, the detector 42 detects a state of the unevenness of a road surface using the suspension information or the front camera image from the acquisition section 41. Further, the detector 42 detects the inclinations of the vehicle 10 to the front and to the back, that is, in the pitch direction as well as the inclinations of the vehicle 10 to the left and to the right, that is, in the roll direction due to the unevenness of the road surface, and detects (calculates) inclination information that indicates (the levels of) the inclinations. Then, the detector 42 supplies the inclination information to the controller 71.

Here, in the first example of the configuration of the viewing system, reading of a read image from the image sensor 32 is controlled according to the inclinations of the vehicle 10 to the front and to the back, that is, in the pitch direction. In the second example of the configuration of the viewing system, reading of a read image from the image sensor 32, and a rotation of the read image that is performed by the processing section are controlled according to the inclination of the vehicle 19 to the left and the right, that is, in the roll direction.

On the other hand, in the third example of the configuration of the viewing system, reading of a read image from the image sensor 32, and a rotation of the read image that is performed by the processing section 72 are controlled according to the inclinations of the vehicle 10 to the front and to the back, that is, in the pitch direction, and according to the inclinations of the vehicle to the left and to the right, that is, in the roll direction.

Thus, in the third example of the configuration of the viewing system, a control obtained by combining the controls of reading of a read image from the image sensor 32 that are respectively performed in the first and second examples of the configuration of the viewing system, is performed as a control of reading of a read image from the image sensor 32. Further, in the third example of the configuration of the viewing system, the same control as the control of a rotation of a read image that is performed in the second example of the configuration of the viewing system, is performed as a control of a rotation of a read image that is performed by the processing section 72.

<Control of Reading of Read Image That is Performed by Controller 71 According to Inclination Information>0161

FIG. 15 is a diagram describing an example of a control of reading of a read image that is performed by the controller 71 according to inclination information.

Figure 15B:
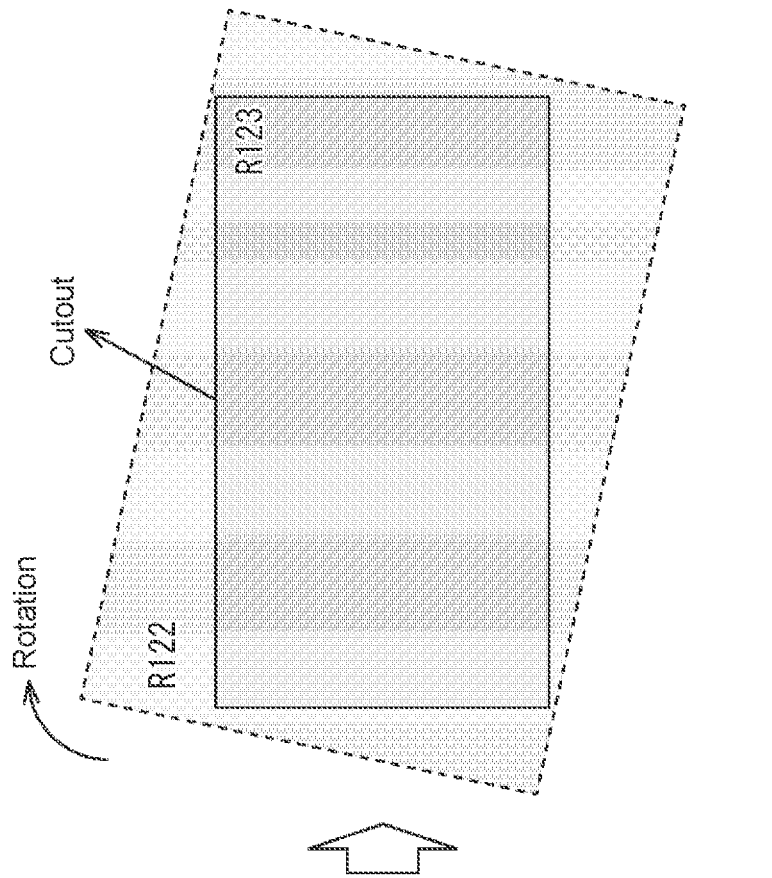
FIG. 15 is a diagram describing an example of a control of reading of a read image that is performed by the controller 71 according to inclination information.
Figure 15A:
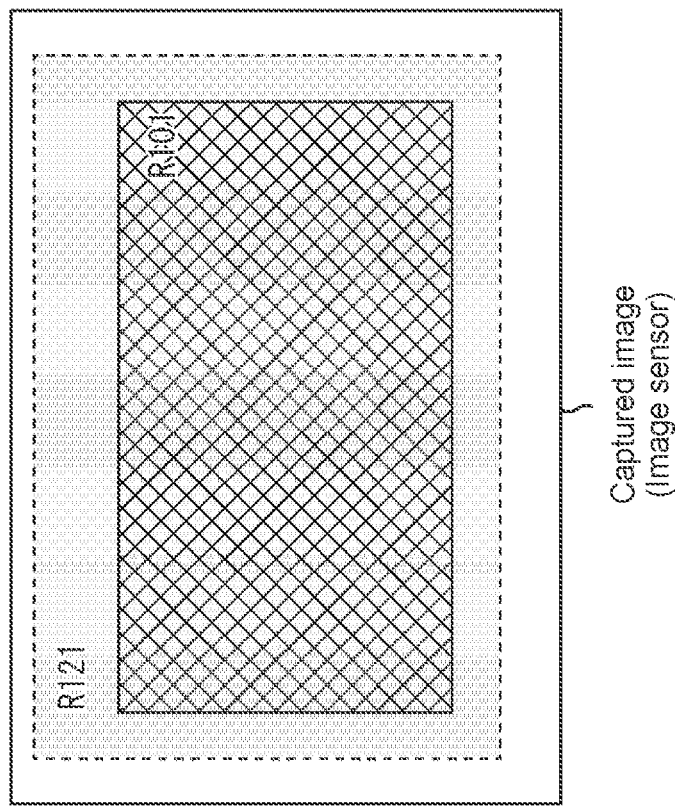

FIG. 15(A) illustrates reading of a read image that is larger in size than a BM image from the image sensor 32. FIG. 15(B) illustrates a rotation of the read image and a cutout that are performed by the processing section 72.

As described with reference to FIGS. 6 and 11, it is assumed that, when the vehicle 10 is on a flat road surface, a reading control is performed by the controller 71 such that (a pixel signal of a pixel of) the rectangular region R101 having the same size as a BM image that is a read image, is read from a captured image captured by the image sensor 32 (from the light-receiving surface of the image sensor 32).

For example, when the vehicle 10 is on an uneven road surface and is inclined in the pitch direction and in the roll direction, the controller 71 controls reading performed by the image sensor 32 such that a reading position used to specify a region R121 is calculated according to inclination information and a pixel signal of the calculated reading position is read, the region R121 being larger in size than the region R111 by the number of pixels corresponding to an angle of the inclination of the vehicle 10 in the roll direction, the region R121 being upwardly or downwardly offset from the region R111 by the number of pixels corresponding to an angle of the inclination of the vehicle 10 in the pitch direction.

Further, for example, a rotation angle used to rotate the region R121 corresponding to a read image output by the image sensor 32 is calculated by the controller 71 according to inclination information, such that the horizontal line appearing in the region R121 corresponding to the read image, appears to extend horizontally, and the calculated rotation angle is supplied by the controller 71 to the processing section 72.

The rectangular region R121 is read by the image sensor 32 as a read image in accordance with the reading control performed by the controller 71, and is supplied by the image sensor 32 to the processing section 72.

The region R121 that is the read image from the image sensor 32 is rotated by the processing section 72 by the rotation angle from the controller 71. Then, a region R123 that has the same size as a BM image and of which the angle of rotation is 0 degrees, is cut out of a region R122 by the processing section 72 as the BM image, the region R122 being obtained by rotating the region R121.

In FIG. 15, the vehicle 10 is inclined to the back, that is, in the pitch direction, and is inclined to the right, that is, in the roll direction. Thus, the region R121 that is larger in size than the region R101 and is upwardly offset from the region R101 is read from the image sensor 32 as a read image. Further, the vehicle 10 is inclined to the right, that is, in the roll direction, and thus the horizontal line appearing in the region R121 that is the read image is inclined diagonally upward right. Thus, the region R121 that is the read image is rotated clockwise by the processing section 72 such that the horizontal line inclined diagonally upward right extends horizontally. Further, the region R123 that is a BM image is cut out of the region R122 by the processing section 72, the region R122 being obtained by rotating the region R121.

Accordingly, it is possible to easily obtain, as a BM image, an image suitable for the operation of the vehicle 10. In other words, it is possible to easily obtain a BM image exhibiting image representation similar to that of a BM image obtained when the vehicle 10 is on a flat road surface, regardless of the inclination of the vehicle in the pitch direction and the inclination of the vehicle 10 in the roll direction. This makes it possible to display an image in which the horizontal line extends horizontally regardless of the inclination of the vehicle Thus, there is no difference in display image (no difference in a position of the horizontal line) due to a temporary difference in inclination from a rear vehicle. This enables a driver to grasp a state behind the vehicle without worrying about a difference in display image that is caused during driving (a difference in a position of the horizontal line).

Note that, in the third example of the configuration of the viewing system, the detector 42 can detect the inclinations of the vehicle 10 in the pitch direction and in the roll direction from, for example, suspension information.

Further, the detector 42 can recognize the unevenness of a road surface ahead of the vehicle 10 from, for example, a front camera image, and, according to a result of recognizing the unevenness, the detector 42 can estimate to detect the inclinations of the vehicle 10 in the pitch direction and in the roll direction when the vehicle 10 travels on the road surface having the recognized unevenness.

<Display Processing>

Figure 16:
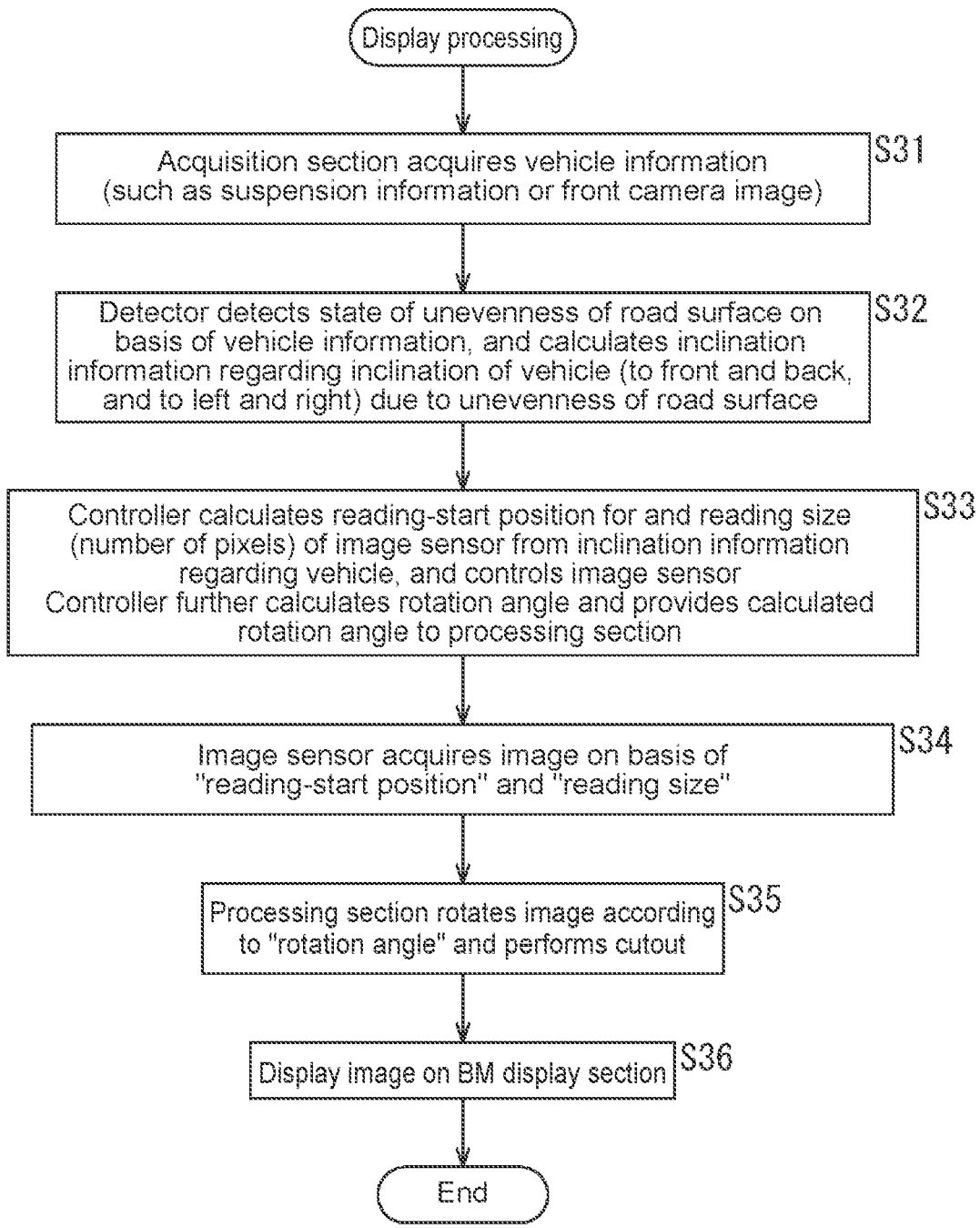
FIG. 16 is a flowchart describing an example of display processing of displaying a BM image that is performed in the third example of the configuration of the viewing system.

FIG. 16 is a flowchart describing an example of display processing of displaying a BM image that is performed in the third example of the configuration of the viewing system of FIG. 14.

In Step S31, the acquisition section 41 acquires suspension information or a front camera image as vehicle information, and supplies the vehicle information to the detector 42. Then, the process moves on to Step S32.

In Step S32, the detector 42 detects, using the vehicle information from the acquisition section 41, a state of the unevenness of a road surface on which the vehicle 10 is situated. Further, the detector 42 detects (calculates), using the vehicle information from the acquisition section 41, inclination information that indicates the inclination of the vehicle 10 due to the unevenness of a road surface (the inclinations to the front and to the back, that is, in the pitch direction, and the inclinations to the left and to the right, that is, in the roll direction), and supplies the detected inclination information to the controller 71. Then, the process moves on to Step S33 from Step S32.

In Step S33, the controller 71 calculates, according to the inclination information from the detector 42, a reading-start position for and the reading size of a read image from the image sensor 32, and supplies the reading-start position and the reading size to the image sensor 32 as a reading position. Further, the controller 71 calculates, according to the inclination information from the detector 42, a rotation angle used to rotate the read image, and supplies the calculated rotation angle to the processing section 72. Then, the process moves on to Step S34 from Step S33.

In Step S34, the image sensor 32 reads a pixel signal of a pixel of the reading position supplied by the controller 71, and acquires a read image that exhibits a pixel value corresponding to the pixel signal to output the acquired read image. The read image output by the image sensor 32 is supplied to the processing section 72, and the process moves on to Step S35 from Step S34.

In Step S35, the processing section 72 rotates the read image from the image sensor 32 by the rotation angle from the controller 71. Further, the processing section 72 cuts a BM image out of the rotated read image, and supplies the BM image to the output section 33. Then, the process moves on to Step S36 from Step S35.

In Step S36, the output section 33 transmits, to the BM display section 21, the BM image from the processing section 72, and causes the BM image to be displayed on the BM display section 21. This results in the BM image being displayed on the BM display section 21, and the displaying processing is terminated.

As described above, in the third example of the configuration of the viewing system, inclination information is detected that indicates the inclinations to the front and to the back, that is, in the pitch direction as well as the inclinations to the left and to the right, that is, in the roll direction, and reading of a read image from the image sensor 32 is controlled according to the inclination information. Further, in the third example of the configuration of the viewing system, a rotation of the read image is controlled according to the inclination information, and a BM image is cut out of the read image after the rotation. Thus, the third example of the configuration of the viewing system makes it possible to easily provide an image suitable for the operation of the vehicle 10. In other words, a BM image having an amount of information similar to that of a BM image obtained when the vehicle 10 is on a flat road surface, can be easily provided when the vehicle 10 is on an uneven road surface.

Further, in the third example of the configuration of the viewing system, a read image having a smallest size such that a BM image can be cut out of the read image after rotation, is read from the image sensor 32 in the reading control, as in the second example of the configuration of the viewing system. This makes it possible to reduce the possibility of reducing the frame rate of the BM image.

The suspension information and the front camera image have been described as examples of the vehicle information in the third configuration example. However, the gyroscopic information; the GPS information and the 3D map; or the like may be used as the vehicle information, as in the first or second configuration example described above. Then, the inclination of the vehicle may be detected using the gyroscopic information; the GPS information and the 3D map; or the like.

Note that the present technology is applicable not only to the case in which the vehicle 10 is inclined according to a state of a road surface on which the vehicle 10 is situated, but also to the case in which the vehicle 10 is inclined according to, for example, an object loaded on the vehicle 10 or a state of an occupant of the vehicle 10. In other words, the present technology is applicable regardless of a cause for the inclination of the vehicle 10.

Fourth Example of Configuration of Viewing System

Figure 17:
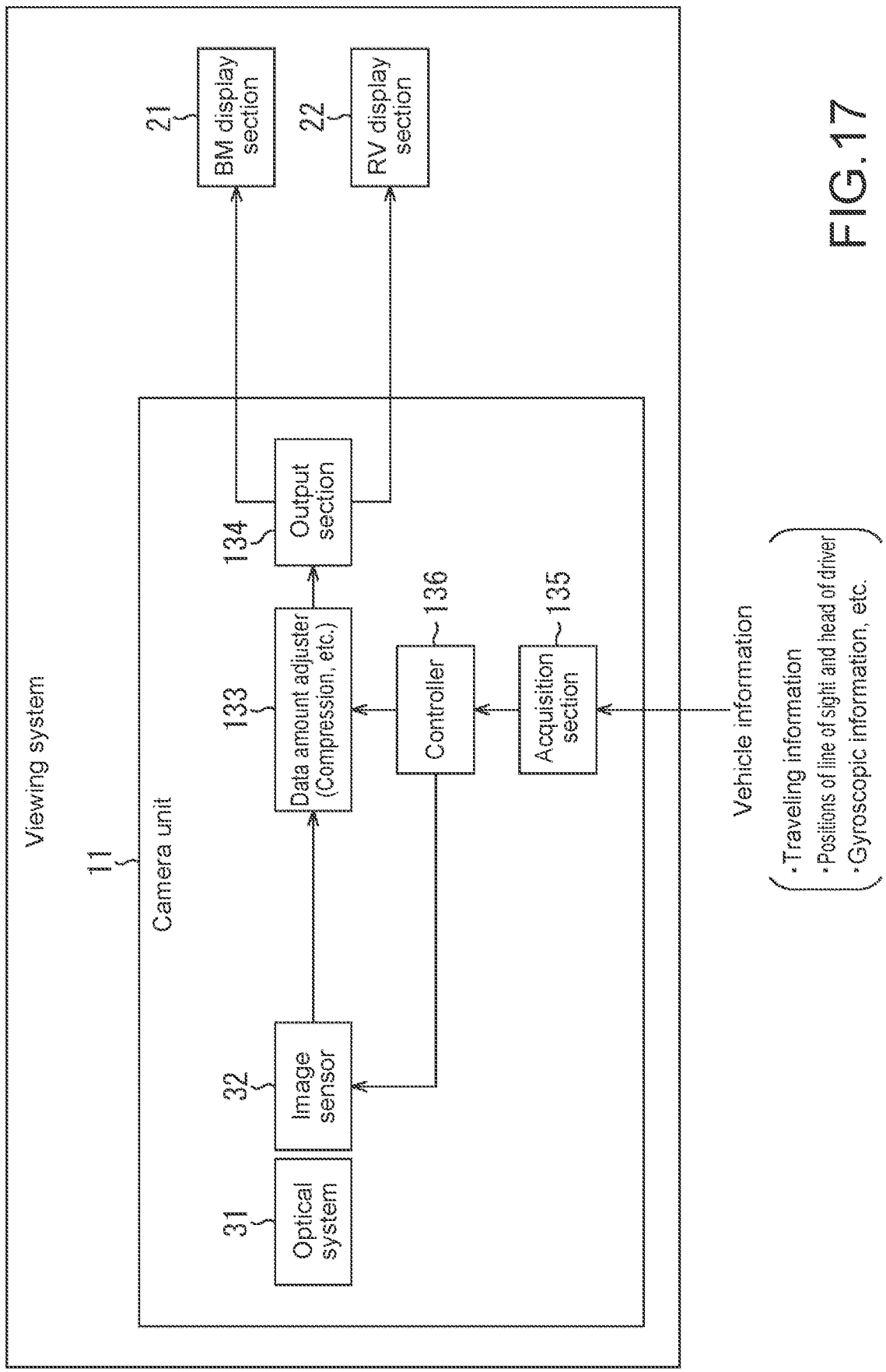
FIG. 17 is a block diagram illustrating a fourth example of the configuration of the viewing system included in the vehicle 10.

FIG. 17 is a block diagram illustrating a fourth example of the configuration of the viewing system included in the vehicle 10.

The viewing system includes the camera unit 11, the BM display section 21, and the RV display section 22 described with reference to FIGS. 1 and 2.

The camera unit 11 includes the optical system 31, the image sensor 32, a data amount adjuster 133, an output section 134, an acquisition section 135, and a controller The optical system 31 includes optical components such as a condenser and a diaphragm, and collects light entering the optical system 31 onto the image sensor 32.

The image sensor 32 receives light from the optical system 31 and performs photoelectric conversion to capture a captured image. Then, in accordance with control performed by the controller 136, the image sensor 32 extracts a BM image and an RV image from the captured image to output the extracted images. The BM image and the RV image that are output by the image sensor 32 are supplied to the data amount adjuster 133.

In accordance with control performed by the controller 136, the data amount adjuster 133 adjusts data amounts of the BM image and the RV image that are output by the image sensor 32, and supplies, to the output section 134, the BM image and the RV image of which the respective data amounts have been adjusted.

The output section 134 is an output interface (IF) that transmits, to the outside of the camera unit 11, the BM image and the RV image from the data amount adjuster 133. The output section 134 transmits the BM image to the BM display section 21, and transmits the RV image to the RV display section 22. The BM image from the output section 134 is displayed on the BM display section 21 in accordance with the specification of the BM display section 21, and the RV image from the output section 134 is displayed on the RV display section 22 in accordance with the specification of the RV display section 22. The output section 134 is capable of performing a format conversion and other image processing on the BM image and the RV image as necessary.

The acquisition section 135 acquires vehicle information from the vehicle 10, and supplies the acquired vehicle information to the controller 136.

Examples of the vehicle information acquired by the acquisition section 135 include traveling information, the specifications of the BM display section 21 and the RV display section 22, positions of the line of sight and the head of a driver of the vehicle 10, and gyroscopic information.

The traveling information is information that indicates a traveling state of the vehicle 10, and specifically indicates a vehicle speed and a traveling direction (forward or backward). For example, it is possible to acquire the vehicle speed from output of a speed sensor when the vehicle 10 includes the speed sensor. For example, it is possible to acquire the traveling direction from a state of the transmission.

For example, the specifications of the BM display section 21 and the RV display section 22 are the resolution of the BM display section 21 and the resolution of the RV display section 22, and can be acquired from the BM display section 21 and the RV display section 22.

The positions of the line of sight and the head of a driver of the vehicle 10 are obtained from an image captured by the in-vehicle camera 23.

The gyroscopic information is information that indicates a pose of the vehicle 10 (/ an angle of the inclination of the vehicle). It is possible to obtain the gyroscopic information from output of a gyroscope when the vehicle 10 includes the gyroscope. The use of the gyroscopic information makes it possible to recognize whether the vehicle 10 is on a hill.

The controller 136 controls the image sensor 32 and the data amount adjuster 133 according to the vehicle information supplied by the acquisition section 135.

In other words, for example, the controller performs a reading control similar to the reading control performed by the controller 43, according to the vehicle information. Accordingly, the controller 136 performs an extraction control for controlling extraction of a BM image and an RV image from a captured image captured by the image sensor 32. Examples of ranges of reading the BM image and the RV image include the ranges illustrated in FIG. 4. Further, according to the vehicle information, the controller 136 performs an adjustment control for controlling adjustment of data amounts of the BM image and the RV image that is performed by the data amount adjuster 133.

Thus, it can be said that the image sensor extracts a BM image and an RV image from a captured image according to vehicle information, and the data amount adjuster 133 adjusts data amounts of the BM image and the RV image according to the vehicle information.

<Image That Can be Output by Image Sensor 32>

Figure 18:
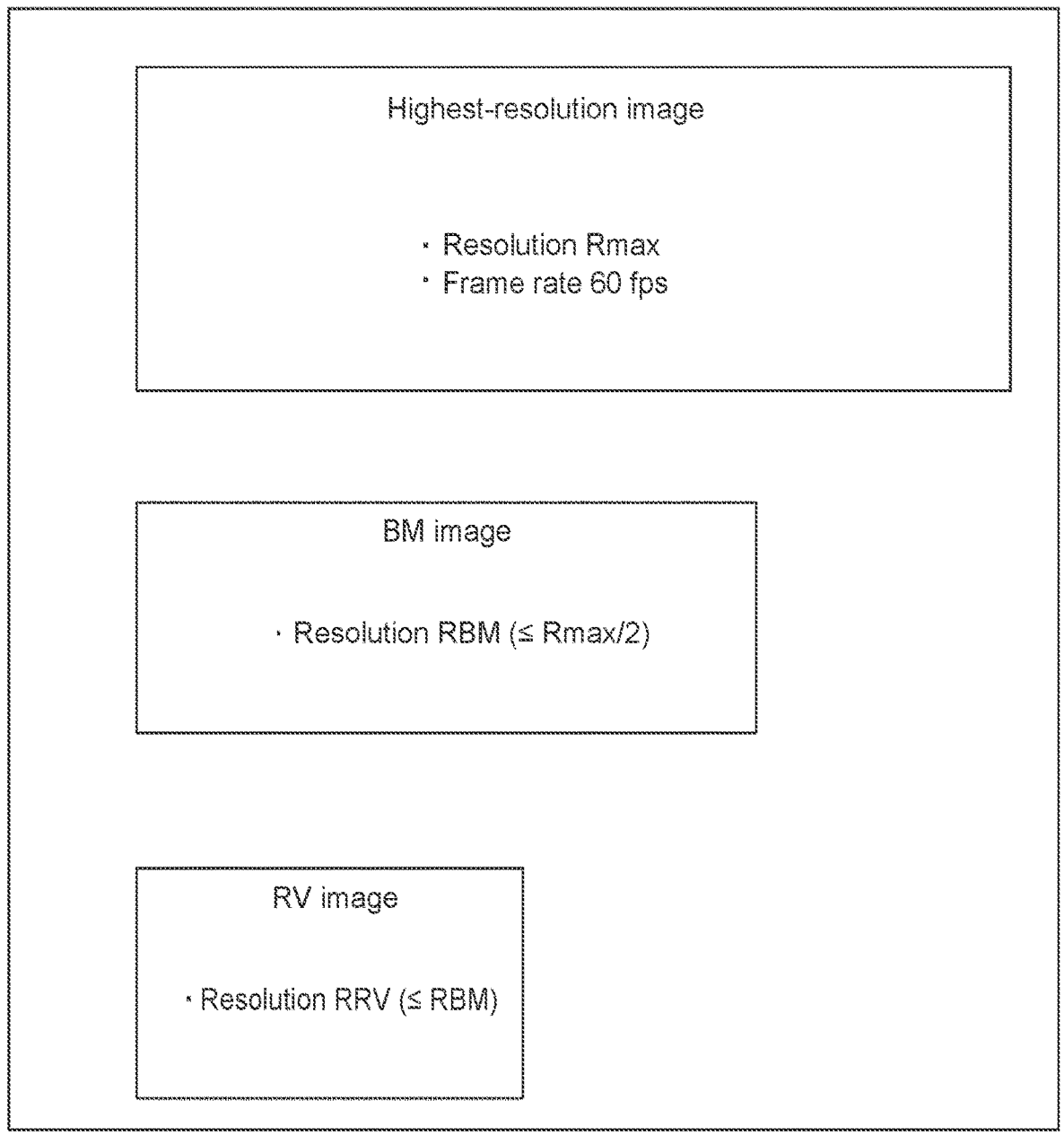
FIG. 18 illustrates an example of an image that can be output by the image sensor 32.

FIG. 18 illustrates an example of an image that can be output by the image sensor 32.

Here, a highest-resolution captured image that can be output by the image sensor 32 is referred to as a highest-resolution image. It is assumed that, for example, the image sensor 32 has the ability to output a highest-resolution image of a resolution (the number of pixels) Rmax at (a frame rate of) 60 fps (frame per second) or more.

Here, it is assumed that a resolution RBM for a highest-resolution BM image (a BM image of a largest number of pixels) that is extracted from the highest-resolution image is equal to or less than ½ of the resolution Rmax for the highest-resolution image. It is also assumed that a resolution RRV for a highest-resolution RV image that is extracted from the highest-resolution image is equal to or less than the resolution RBM for the BM image.

In the present embodiment, it is assumed that, for example, a sum RBM+RRV of the resolution RBM for a BM image and the resolution RRV for an RV image is equal to or less than ½ of the resolution Rmax for the highest-resolution image. In this case, the use of the image sensor capable of outputting a highest-resolution image of the resolution Rmax at 60 fps (or more) makes it possible to output both the BM image of the resolution RBM and the RV image of the resolution RRV at 120 fps, the BM image and the RV image being obtained by partially reading the high-resolution image.

Example of Vehicle Transmission Bandwidth That Can be Used for Data Transmission in Vehicle 10

FIG. 19 is a diagram describing an example of a vehicle transmission bandwidth that can be used for data transmission in the vehicle 10.

In other words, FIG. 19 illustrates examples of a BM image and an RV image that can be output by the camera unit 11 without data amounts being adjusted by the data amount adjuster 133.

For example, the camera unit 11 can output, as a BM image, a color image of the resolution RBM in a YUV 4:2:2 format in which the number of bits per pixel is eight (with respect to each of the brightness and a difference in color). Further, for example, the camera unit 11 can output, as an RV image, a color image of the resolution RRV in the YUV 4:2:2 format in which the number of bits per pixel is eight.

The BM image of the resolution RBM in the YUV 4:2:2 format in which the number of bits per pixel is eight is referred to as a highest-quality BM image, and the RV image of the resolution RRV in the YUV 4:2:2 format in which the number of bits per pixel is eight is referred to as a highest-quality RV image.

In the present embodiment, it is assumed that the vehicle transmission bandwidth, which is a bandwidth in which data is transmitted from the camera unit 11, is a transmission bandwidth in which, for example, two screens of a highest-quality BM image at 60 fps can be transmitted (in real time). In the present embodiment, the vehicle transmission bandwidth, in which two screens of a highest-quality BM image at 60 fps can be transmitted, makes it possible to transmit, for example, two screens of a highest-quality RV image at 60 fps, since RBM RRV. Further, the vehicle transmission bandwidth makes it possible to transmit, for example, two screens in total that are a single screen of the highest-quality BM image at fps, and a single screen of the highest-quality RV image at 60 fps.

As described with reference to FIGS. 18 and 19, the camera unit 11 is capable of outputting both a highest-quality BM image and a highest-quality RV image at up to 120 fps.

However, in the present embodiment, the vehicle transmission bandwidth only makes it possible to transmit two screens of a highest-quality BM image (or RV image) at 60 fps.

The increase in vehicle transmission bandwidth makes it possible to transmit both a highest-quality BM image and a highest-quality RV image at 120 fps that can be output by the camera unit 11. However, the increase in vehicle transmission bandwidth results in increasing the costs for the viewing system.

In the present technology, the camera unit appropriately adjusts data amounts of a BM image and an RV image to transmit the BM image and the RV image in the vehicle transmission bandwidth, in order to suppress an increase in the costs for the viewing system.

<Control of Adjustment of Data Amounts of BM Image and RV Image When Two Screens of Highest-Quality BM Image at 60 fps Can be Transmitted in Vehicle Transmission Bandwidth>

Figure 20:
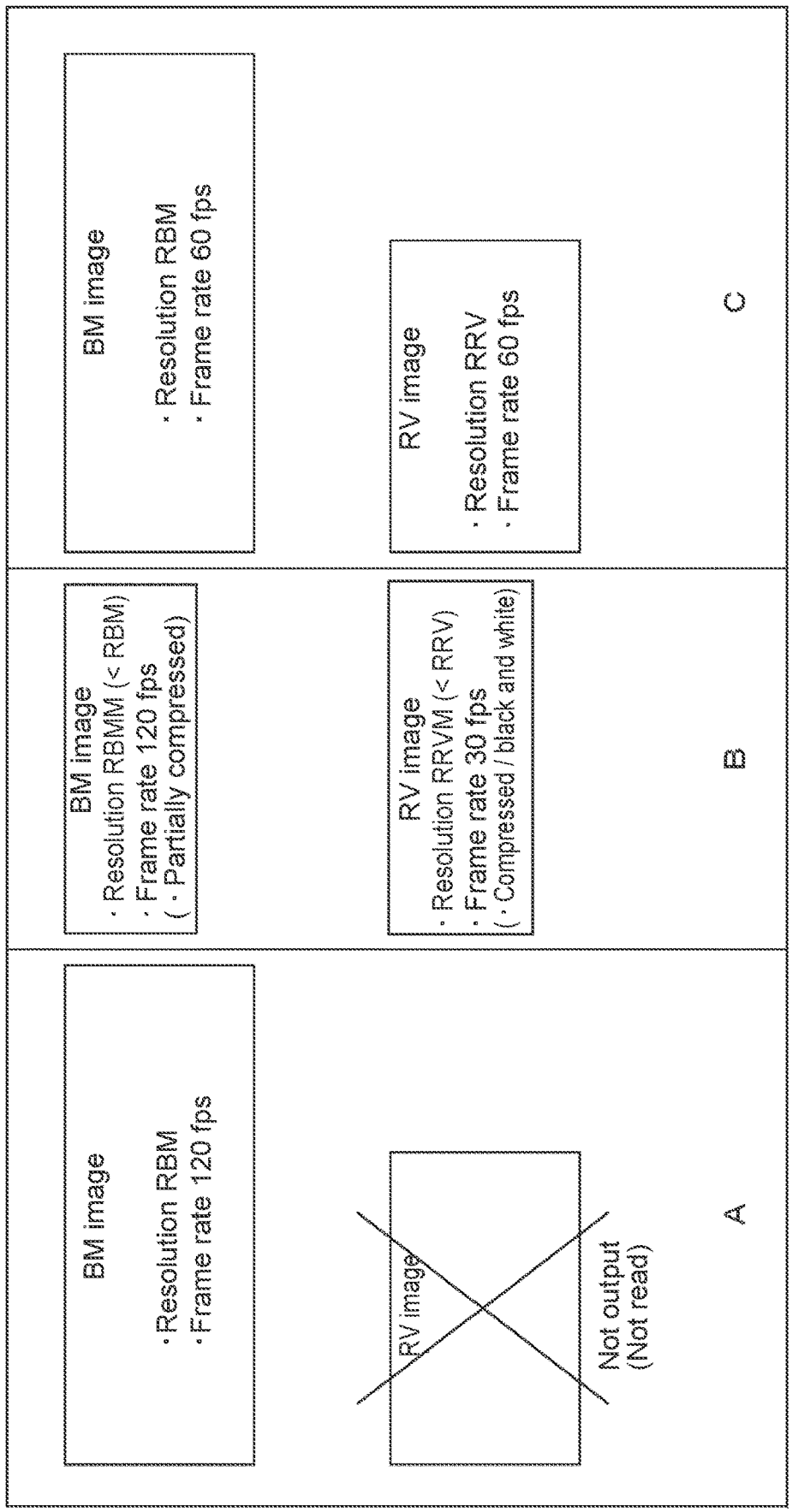
FIG. 20 is a diagram describing a first example of a control of adjustment of data amounts of a BM image and an RV image, the control being performed by a controller 136.

FIG. 20 is a diagram describing a first example of a control of adjustment of data amounts of a BM image and an RV image, the control being performed by the controller 136.

A of FIG. 20 illustrates the adjustment control performed when the vehicle 10 is traveling forward, or is traveling backward at a high speed that is a speed equal to or greater than a first threshold for speed.

In this case, the controller 136 performs an adjustment control that is a control of the data amount adjuster 133, such that a BM image of the resolution RBM at fps is output and output of an RV image is restricted. In accordance with the adjustment control performed by the controller 136, the data amount adjuster 133 adjusts data amounts of a BM image and an RV image from the image sensor to output the BM image of the resolution RBM at 120 fps and to restrict output of the RV image.

Thus, in this case, the BM image of the resolution RBM at 120 fps is output from the camera unit 11, and the RV image is not output from the camera unit 11. Consequently, the BM image of the resolution RBM at 120 fps is displayed on the BM display section 21, and the RV image is not displayed on the RV display section 22.

As described above, when the vehicle 10 is traveling forward, or is traveling backward at the high speed, a driver can confirm a region situated further rearward than a region just behind the rear of the vehicle 10, using a BM image of the resolution RBM at 120 fps, that is, a high-resolution BM image at a high frame rate.

Note that, when the vehicle 10 is traveling forward, or is traveling backward at the high speed, an RV image that includes an image of the region just behind the rear of the vehicle 10 is not displayed.

Further, a BM image of the resolution RBM at fps that is output by the camera unit 11 can be transmitted in the vehicle transmission bandwidth in which two screens of a highest-quality BM image (of the resolution RBM) at 60 fps can be transmitted.

Here, examples of a data amount adjusting method for adjusting a data amount of an image that is performed by the data amount adjuster 133 include a method for reducing resolution (the number of pixels), a method for reducing gradation (the number of bits per pixel), a method for reducing a frame rate, and a compression method using a specified compression-encoding approach, in addition to the method for restricting output of an image (not outputting an image) as described above.

In addition to being performed by the data amount adjuster 133, a restriction of output of an image, a reduction in resolution, a reduction in gradation, and a reduction in frame rate from among the data amount adjusting methods can be performed by the image sensor 32 by the controller 136 performing control such as a control of extraction performed by the image sensor 32.

In other words, the restriction of output of an image such as a restriction of output of an RV image can be performed by the controller 136 controlling reading of data from the image sensor 32 and not reading a pixel signal corresponding to the RV image from the pixel 51 (FIG. 7), such that extraction of an RV image from a captured image is restricted. When the vehicle 10 is traveling forward, or is traveling backward at the high speed, the controller 136 can control, according to vehicle information, extraction performed by the image sensor 32 such that extraction of an RV image from a captured image is restricted. Of course, output of an RV image may be restricted by the data amount adjuster 133, not by the image sensor 32.

The resolution of an image can be reduced by, for example, the controller 136 controlling the image sensor 32 such that the number of pixels 51 from which a pixel signal is read is reduced, or such that binning for adding pixel signals of a plurality of pixels 51 is performed by performing, for example, a so-called source follower (SF) addition or floating diffusion (FD) addition.

The gradation can be reduced by, for example, the controller 136 controlling the image sensor 32 such that the number of bits necessary for AD conversion performed by the AD converter 55 (FIG. 7) is reduced.

The frame rate can be reduced by, for example, the controller 136 controlling the image sensor 32 such that a rate at which a pixel signal is read from the pixel 51, or a rate at which AD conversion is performed by the AD converter 55 is reduced.

B of FIG. 20 illustrates the adjustment control performed when the vehicle 10 is traveling backward at a medium speed that is a speed that is less than the first threshold and is equal to or greater than a second threshold less than the first threshold.

In this case, the controller 136 performs an adjustment control that is a control of the data amount adjuster 133 such that a BM image of a resolution RBMM at fps is output and an RV image of a resolution RRVM at fps is output, the resolution RBMM being less than the resolution RBM, the resolution RRVM being less than the resolution RRV. In accordance with the adjustment control performed by the controller 136, the data amount adjuster adjusts data amounts of a BM image and an RV image from the image sensor 32 to output the BM image of the resolution RBMM at 120 fps and to output the RV image of the resolution RRVM at 30 fps.

Thus, in this case, the BM image of the resolution RBMM at 120 fps and the RV image of the resolution RRVM at 30 fps are output by the camera unit 11. Consequently, the BM image of the resolution RBMM at 120 fps is displayed on the BM display section 21, and the RV image of the resolution RRVM at 30 fps is displayed on the RV display section 22.

As described above, when the vehicle 10 is traveling backward at the medium speed, a driver can confirm a region situated further rearward than a region just behind the rear of the vehicle 10, using a BM image of the resolution RBMM at 120 fps, that is, a medium-resolution BM image at the high frame rate. Further, the driver can confirm the region just behind the rear of the vehicle 10, using an RV image of the resolution RRVM at 30 fps, that is, a medium-resolution RV image at a low frame rate.

Note that it is assumed that a transmission bandwidth necessary to transmit an RV image of the resolution RRVM at 30 fps is equal to or less than a transmission bandwidth for a difference between a maximum transmission rate (here, a transmission rate necessary to transmit a BM image of the resolution RBM at 120 fps without compressing the BM image) and a transmission rate (a first transmission rate) necessary to transmit the resolution RBMM at 120 fps. In this case, both a BM image of the resolution RBMM at 120 fps and an RV image of the resolution RRVM at 30 fps that are output by the camera unit 11 can be transmitted in the vehicle transmission bandwidth in which two screens of a highest-quality BM image at 60 fps can be transmitted.

Here, when the transmission bandwidth necessary to transmit an RV image of the resolution RRVM at fps is not equal to or less than the transmission bandwidth for the difference between the maximum transmission rate and the first transmission rate, one of the BM image and the RV image or both of them can be compressed (compression-encoded) by the data amount adjuster 133 such that the transmission bandwidth necessary to transmit the RV image of the resolution RRVM at 30 fps is equal to or less than the transmission bandwidth for the difference between the maximum transmission rate and the first transmission rate (such that the RV image of the resolution RRVM can be transmitted). For example, with respect to a BM image of the resolution RRVM at 120 fps, a portion of or all of the BM image is compressed (compression-encoded). This results in being able to reduce a data amount of the BM image. With respect to an RV image of the resolution RRVM at 30 fps, the RV image is compression-encoded in a state of remaining a color image, or is converted into a black-and-white image to be compression-encoded. This results in being able to reduce a data amount of the RV image.

C of FIG. 20 illustrates the adjustment control performed when the vehicle 10 is traveling backward at a low speed that is a speed that is less than the second threshold less than the first threshold.

In this case, the controller 136 performs an adjustment control that is a control of the data amount adjuster 133 such that a BM image of the resolution RBM at fps is output and an RV image of the resolution RRV at fps is output. In accordance with the adjustment control performed by the controller 136, the data amount adjuster adjusts data amounts of a BM image and an RV image from the image sensor 32 to output the BM image of the resolution RBM at 60 fps and to output the RV image of the resolution RRV at 60 fps.

Thus, in this case, the BM image of the resolution RBM at 60 fps and the RV image of the resolution RRV at 60 fps are output by the camera unit 11. Consequently, the BM image of the resolution RBM at 60 fps is displayed on the BM display section 21, and the RV image of the resolution RRV at 60 fps is displayed on the RV display section 22.

As described above, when the vehicle 10 is traveling backward at the low speed, a driver can confirm a region situated further rearward than a region just behind the rear of the vehicle 10, using a BM image of the resolution RBM at 60 fps, that is, a high-resolution BM image at a medium frame rate. Further, the driver can confirm the region just behind the rear of the vehicle 10, using an RV image of the resolution RRV at 60 fps, that is, a high-resolution RV image at the medium frame rate.

The case in which the vehicle 10 is traveling backward at the low speed is, for example, a case in which a driver is about to park the vehicle 10, and it is important to confirm a region just behind the rear of the vehicle 10 that is a blind spot as viewed from the driver. Thus, when the vehicle 10 is traveling backward at the low speed, an RV image is displayed at a higher resolution and at a higher frame rate, compared to when the vehicle 10 is traveling backward at the high speed or the medium speed. This makes it possible to easily confirm a region of a blind spot and to easily control the vehicle according to a state of the blind spot.

Note that both a BM image of the resolution RBM at 60 fps and an RV image of the resolution RRV at 60 fps that are output by the camera unit 11 can be transmitted in the vehicle transmission bandwidth in which two screens of a highest-quality BM image at 60 fps can be transmitted.

<Control of Adjustment of Data Amounts of BM Image and RV Image When Single Screen of Highest-Quality BM Image at 60 fps Can be Transmitted in Vehicle Transmission Bandwidth>

Figure 21:
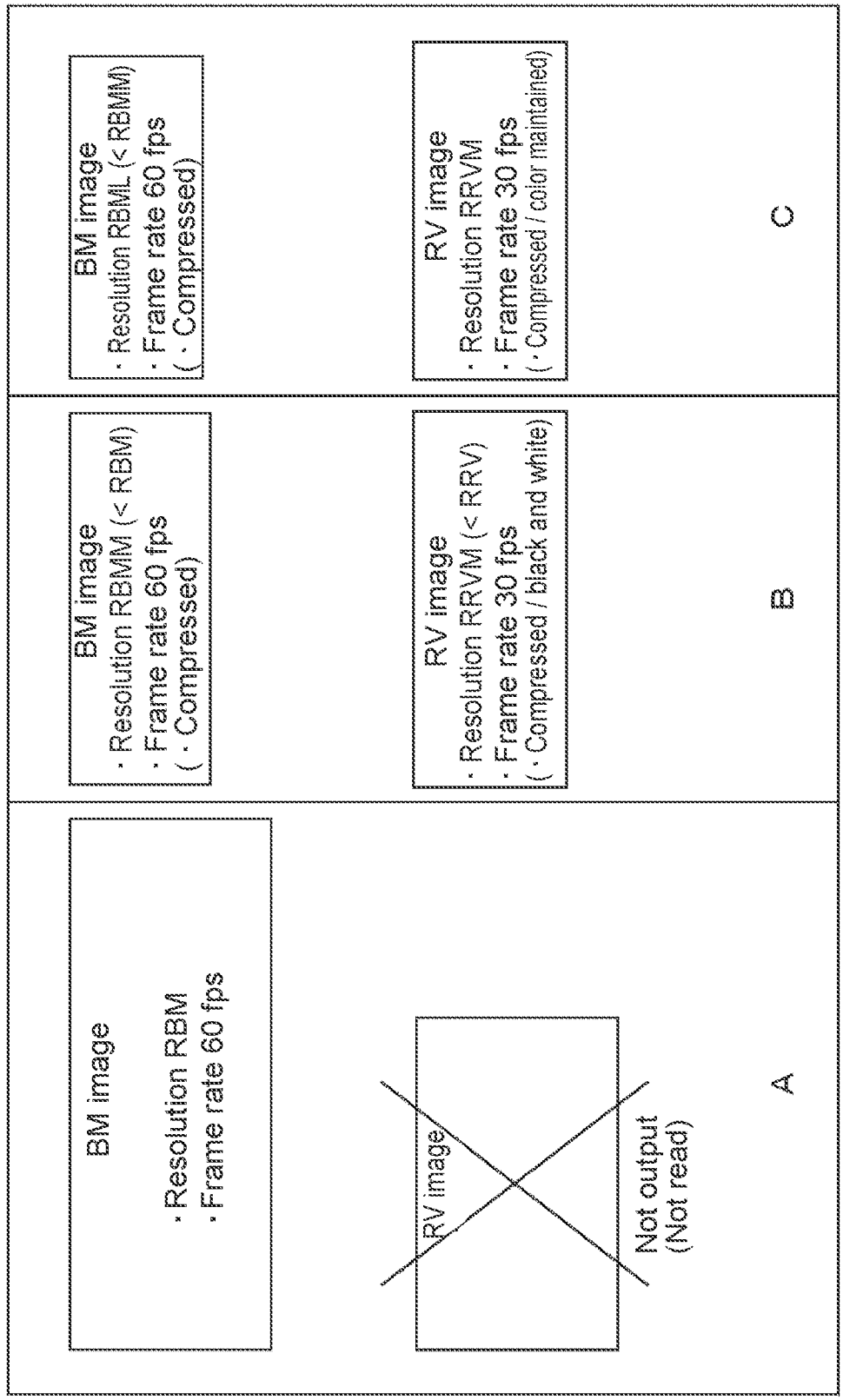
FIG. 21 is a diagram describing a second example of the control of adjustment of data amounts of a BM image and an RV image, the control being performed by the controller 136.

FIG. 21 is a diagram describing a second example of the control of adjustment of data amounts of a BM image and an RV image, the control being performed by the controller 136.

Here, in the second example of the control of adjustment of data amounts of a BM image and an RV image, it is assumed that the vehicle transmission bandwidth is a transmission bandwidth in which, for example, a single screen of a highest-quality BM image (of the resolution RBM) at 60 fps (or more) can be transmitted.

A of FIG. 21 illustrates the adjustment control performed when the vehicle 10 is traveling forward, or is traveling backward at the high speed that is a speed equal to or greater than the first threshold for speed.

In this case, the controller 136 performs an adjustment control that is a control of the data amount adjuster 133, such that a BM image of the resolution RBM at fps (or more) is output and output of an RV image is restricted. In accordance with the adjustment control performed by the controller 136, the data amount adjuster adjusts data amounts of a BM image and an RV image from the image sensor 32 to output the BM image of the resolution RBM at 60 fps and to restrict output of the RV image.

Thus, in this case, the BM image of the resolution RBM at 60 fps is output from the camera unit 11, and the RV image is not output from the camera unit 11. Consequently, the BM image of the resolution RBM at 60 fps is displayed on the BM display section 21, and the RV image is not displayed on the RV display section 22.

As described above, when the vehicle 10 is traveling forward, or is traveling backward at the high speed, a driver can confirm a region situated further rearward than a region just behind the rear of the vehicle 10, using a BM image of the resolution RBM at 60 fps, that is, a high-resolution BM image at the medium frame rate.

Note that, when the vehicle 10 is traveling forward, or is traveling backward at the high speed, an RV image that includes an image of the region just behind the rear of the vehicle 10 is not displayed, as described with reference to A of FIG. 20.

Further, a BM image of the resolution RBM at 60 fps that is output by the camera unit 11 can be transmitted in the vehicle transmission bandwidth in which a single screen of a highest-quality BM image (of the resolution RBM) at 60 fps can be transmitted.

B of FIG. 21 illustrates the adjustment control performed when the vehicle 10 is traveling backward at the medium speed that is a speed that is less than the first threshold and is equal to or greater than the second threshold less than the first threshold.

In this case, the controller 136 performs an adjustment control that is a control of the data amount adjuster 133 such that a BM image of the resolution RBMM at fps is output and an RV image of the resolution RRVM at fps is output, the resolution RBMM being less than the resolution RBM, the resolution RRVM being less than the resolution RRV. In accordance with the adjustment control performed by the controller 136, the data amount adjuster adjusts data amounts of a BM image and an RV image from the image sensor 32 to output the BM image of the resolution RBMM at 60 fps and to output the RV image of the resolution RRVM at 30 fps.

Thus, in this case, the BM image of the resolution RBMM at 60 fps and the RV image of the resolution RRVM at 30 fps are output by the camera unit 11. Consequently, the BM image of the resolution RBMM at 60 fps is displayed on the BM display section 21, and the RV image of the resolution RRVM at 30 fps is displayed on the RV display section 22.

As described above, when the vehicle 10 is traveling backward at the medium speed, a driver can confirm a region situated further rearward than a region just behind the rear of the vehicle 10, using a BM image of the resolution RBMM at 60 fps, that is, a medium-resolution BM image at the medium frame rate. Further, the driver can confirm the region just behind the rear of the vehicle 10, using an RV image of the resolution RRVM at 30 fps, that is, a medium-resolution RV image at the low frame rate.

Note that, when a transmission bandwidth (hereinafter also referred to as a necessary transmission bandwidth) necessary to transmit both a BM image of the resolution RBMM at 60 fps and an RV image of the resolution RRVM at 30 fps that are output by the camera unit 11, is not within the vehicle transmission bandwidth in which a single screen of a highest-quality BM image at 60 fps can be transmitted, the BM image may be compressed at a first compression rate for medium speed, and the RV image may be compressed in a state of remaining a color image at a second compression rate for medium speed that provides a higher compression than the first compression rate for medium speed, or the RV image may be converted into a black-and-white image to be compressed at the second compression rate for medium speed, such that the necessary transmission bandwidth is within the vehicle transmission bandwidth.

C of FIG. 21 illustrates the adjustment control performed when the vehicle 10 is traveling backward at the low speed that is a speed that is less than the second threshold less than the first threshold.

In this case, the controller 136 performs an adjustment control that is a control of the data amount adjuster 133 such that a BM image of a resolution RBML at fps is output and an RV image of the resolution RRVM at fps is output, the resolution RBML being less than the resolution RBMM. In accordance with the adjustment control performed by the controller 136, the data amount adjuster adjusts data amounts of a BM image and an RV image from the image sensor 32 to output the BM image of the resolution RBML at 60 fps and to output the RV image of the resolution RRVM at 30 fps.

Thus, in this case, the BM image of the resolution RBML at 60 fps and the RV image of the resolution RRV at 30 fps are output by the camera unit 11. Consequently, the BM image of the resolution RBML at 60 fps is displayed on the BM display section 21, and the RV image of the resolution RRVM at 30 fps is displayed on the RV display section 22.

As described above, when the vehicle 10 is traveling backward at the low speed, a driver can confirm a region situated further rearward than a region just behind the rear of the vehicle 10, using a BM image of the resolution RBML at 60 fps, that is, a low-resolution BM image at the medium frame rate. Further, the driver can confirm the region just behind the rear of the vehicle 10, using an RV image of the resolution RRVM at 30 fps, that is, a medium-resolution RV image at the low frame rate.

Note that, when the necessary transmission bandwidth necessary to transmit both a BM image of the resolution RBML at 60 fps and an RV image of the resolution RRVM at 30 fps that are output by the camera unit 11, is not within the vehicle transmission bandwidth in which a single screen of a highest-quality BM image at 60 fps can be transmitted, the BM image may be compressed at a first compression rate for low speed, and the RV image may be compressed (in a state of remaining a color image) at a second compression rate for low speed that provides a higher compression than the first compression rate for low speed, such that the necessary transmission bandwidth is within the vehicle transmission bandwidth.

Here, a rate that provides a higher compression than the first compression rate for medium speed can be adopted as the first compression rate for low speed. The same compression rate can be adopted as the second compression rate for medium speed and the second compression rate for low speed. In this case, the following is the relationship among the first and second compression rates for low speed, and the first and second compression rates for medium speed: the second compression rate for low speed=the second compression rate for medium speed>the first compression rate for low speed>the first compression rate for medium speed. However, here, it is assumed that a compression rate exhibiting a larger value provides a higher compression. The following is the relationship among data amounts respectively obtained by performing compression at the first compression rate for low speed, by performing compression at the second compression rate for low speed, by performing compression at the first compression rate for medium speed, and by performing compression at the second compression rate for medium speed: the data amount obtained by the compression at the second compression rate for low speed=the data amount obtained by the compression at the second compression rate for medium speed<the data amount obtained by the compression at the first compression rate for low speed<the data amount obtained by the compression at the first compression for medium speed.

The adjustment control for adjusting data amounts of a BM image and an RV image according to the vehicle speed and the traveling direction (forward or backward) of the vehicle 10 has been described above. The adjustment control method is not limited to the methods described with reference to FIGS. 20 and 21. In other words, the adjustment control method may be set as appropriate according to, for example, the vehicle transmission bandwidth, the ability of the image sensor 32, and the specifications of the BM display section 21 and the RV display section 22. The data amounts are respectively related to the quality of a displayed BM image and a displayed RV image. Thus, it can be said that the quality of a BM image and the quality of an RV image are changed according to the vehicle speed and the traveling direction (forward or backward) of the vehicle 10.

Further, in the adjustment control, the resolution of the BM image and the resolution of the RV image can be reduced by reducing the number of pixels included in the BM image and the RV image, or by (irreversibly) compressing the BM image and the RV image without changing the number of pixels.

When the resolution of a BM image and the resolution of an RV image are reduced by compressing the BM image and the RV image, it is possible to adopt, as compression rates at which the BM image and the RV image are compressed, compression rates such that a BM image and an RV image that are obtained by performing compression and decompression and from which a portion of frequency components such as a high frequency component has been lost, each have a substantial resolution (a highest frequency component) that is equivalent to the resolution (the number of pixels) described with reference to FIG. 20 or 21.

<Display Processing>

Figure 22:
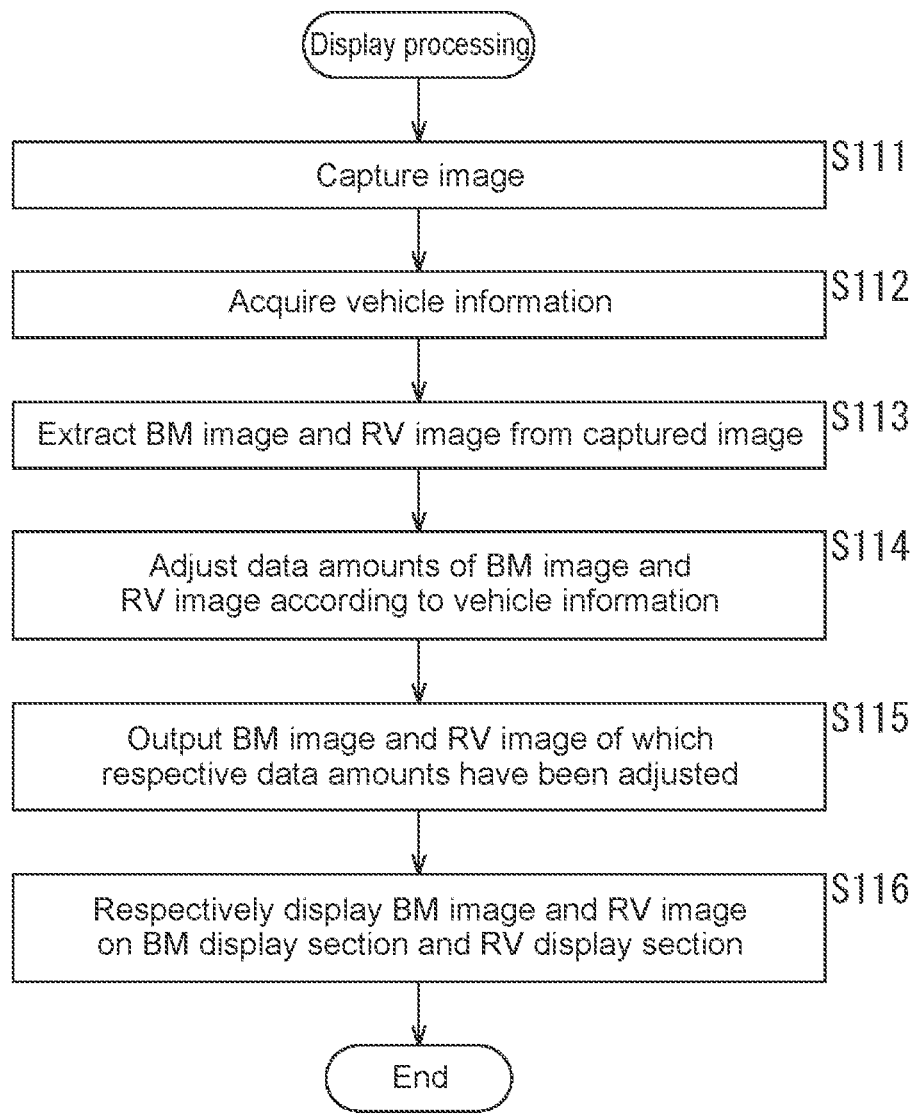
FIG. 22 is a flowchart describing an example of display processing of displaying a BM image and an RV image that is performed in the viewing system.

FIG. 22 is a flowchart describing an example of display processing of displaying a BM image and an RV image that is performed in the viewing system of FIG. 17.

In Step S111, the image sensor 32 captures a captured image, and the process moves on to Step S112.

In Step S112, the acquisition section 135 acquires vehicle information from the vehicle 10, and supplies the vehicle information to the controller 136. Then, the process moves on to Step S113.

In Step S113, the controller 136 controls extraction performed by the image sensor 32 according to the vehicle information from the acquisition section 135. The image sensor 32 extracts a BM image and an RV image from the captured image in accordance with the extraction control performed by the controller 136. Then, the image sensor 32 supplies the BM image and the RV image to the data amount adjuster 133, and the process moves on to Step S114 from Step S113.

In Step S114, the controller 136 controls adjustment performed by the data amount adjuster 133 according to the vehicle information from the acquisition section 135. The data amount adjuster 133 adjusts data amounts of the BM image and the RV image from the image sensor 32 in accordance with the adjustment control performed by the controller 136. Then, the data amount adjuster 133 supplies, to the output section 134, the BM image and the RV image of which the respective data amounts have been adjusted, and the process moves on to Step S115 from Step S114.

In Step S115, the output section 134 outputs, to the outside of the camera unit 11, the BM image and the RV image that are supplied from the data amount adjuster and of which the respective data amounts have been adjusted, transmits the BM image to the BM display section 21, and transmits the RV image to the RV display section 22. Then, the process moves on to Step S116.

In Step S116, the BM display section 21 displays thereon the BM image from the output section 134 in accordance with the specification of the BM display section 21, and the RV display section 22 displays thereon the RV image from the output section 134 in accordance with the specification of the RV display section 22.

Fifth Example of Configuration of Viewing System

Figure 23:
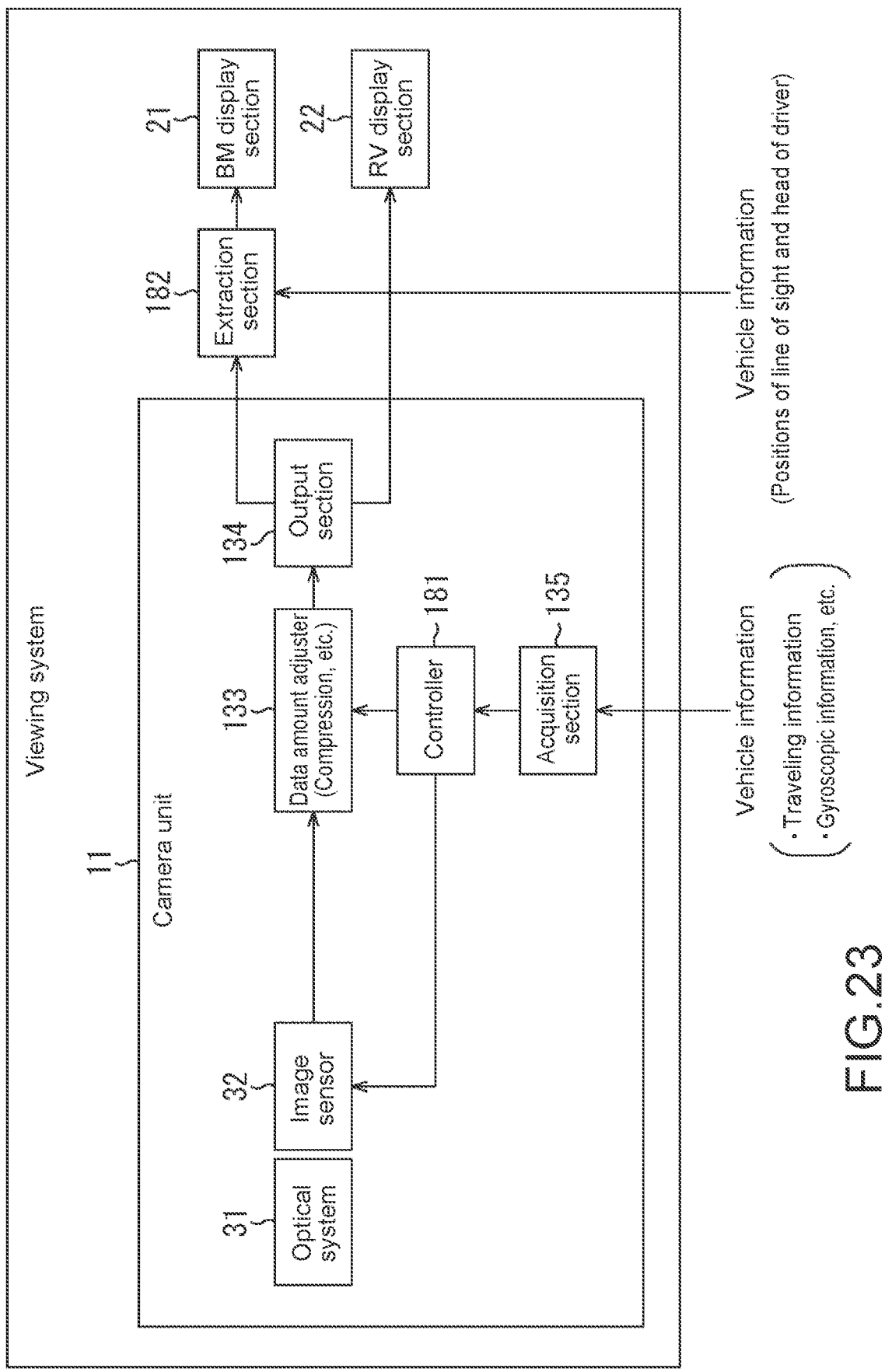
FIG. 23 is a block diagram illustrating a fifth example of the configuration of the viewing system included in the vehicle 10.

FIG. 23 is a block diagram illustrating a fifth example of the configuration of the viewing system included in the vehicle 10.

Note that, in the figure, a portion corresponding to that in FIG. 17 is denoted by the same reference numeral as FIG. 17, and a description thereof is omitted below.

In FIG. 23, the viewing system includes the camera unit 11, the BM display section 21, the RV display section 22, and an extraction section 182, and the camera unit 11 includes the optical system 31, the image sensor 32, the data amount adjuster 133, the output section 134, the acquisition section 135, and a controller 181.

Thus, the viewing system of FIG. 23 is similar to the viewing system of FIG. 17 in including the camera unit 11, the BM display section 21, and the RV display section 22, and in that the camera unit 11 includes the components from the optical system 31 to the acquisition section 135.

However, the viewing system of FIG. 23 is different from the viewing system of FIG. 17 in newly including the extraction section 182, and in that the camera unit 11 includes the controller 181 instead of the controller 136.

Note that the extraction section 182 may be provided within the camera unit 11, although the extraction section 182 is provided outside of the camera unit 11 in FIG. 23.

Vehicle information is supplied by the acquisition section 135 to the controller 181. Examples of the vehicle information include traveling information, the specifications of the BM display section 21 and the RV display section 22, and gyroscopic information. However, in this example, the vehicle information supplied by the acquisition section 135 does not include positions of the line of sight and the head of a driver. Note that the positions of the line of sight and the head of the driver of the vehicle 10 are input to the extraction section 182 as a portion of the vehicle information.

As in the case of the controller 136, the controller 181 controls extraction performed by the image sensor 32 and adjustment performed by the data amount adjuster 133, according to the vehicle information supplied by the acquisition section 135.

However, in the extraction control, the controller 181 causes a region larger in size than the region R11 to be extracted as a BM image instead of controlling (the position of) the region R11 extracted as the BM image, according to one of the positions of the line of sight and the head of the driver, or according to both of them.

Thus, the BM image output by the output section 134 in FIG. 23 is larger in size than the BM image output by the output section 134 in FIGS. 17 and 12.

In FIG. 23, the BM image larger in size than the region R11 output by the output section 134 is supplied to the extraction section 182.

The positions of the line of sight and the head of the driver from among the vehicle information are supplied to the extraction section 182, in addition to the BM image larger in size than the region R11 being supplied by the output section 134 to the extraction section 182.

According to one of the positions of the line of sight and the head of the driver, or according to both of them, the extraction section 182 extracts, as a final BM image to be displayed on the BM display section 21, a region that is a portion of the BM image larger in size than the region R11 from the output section 134, that is, a region having the same size as the region R11, and the extraction section 182 supplies the BM image to the BM display section 21.

<Control of Extraction of BM Image and RV Image from Captured Image>

Figure 24:
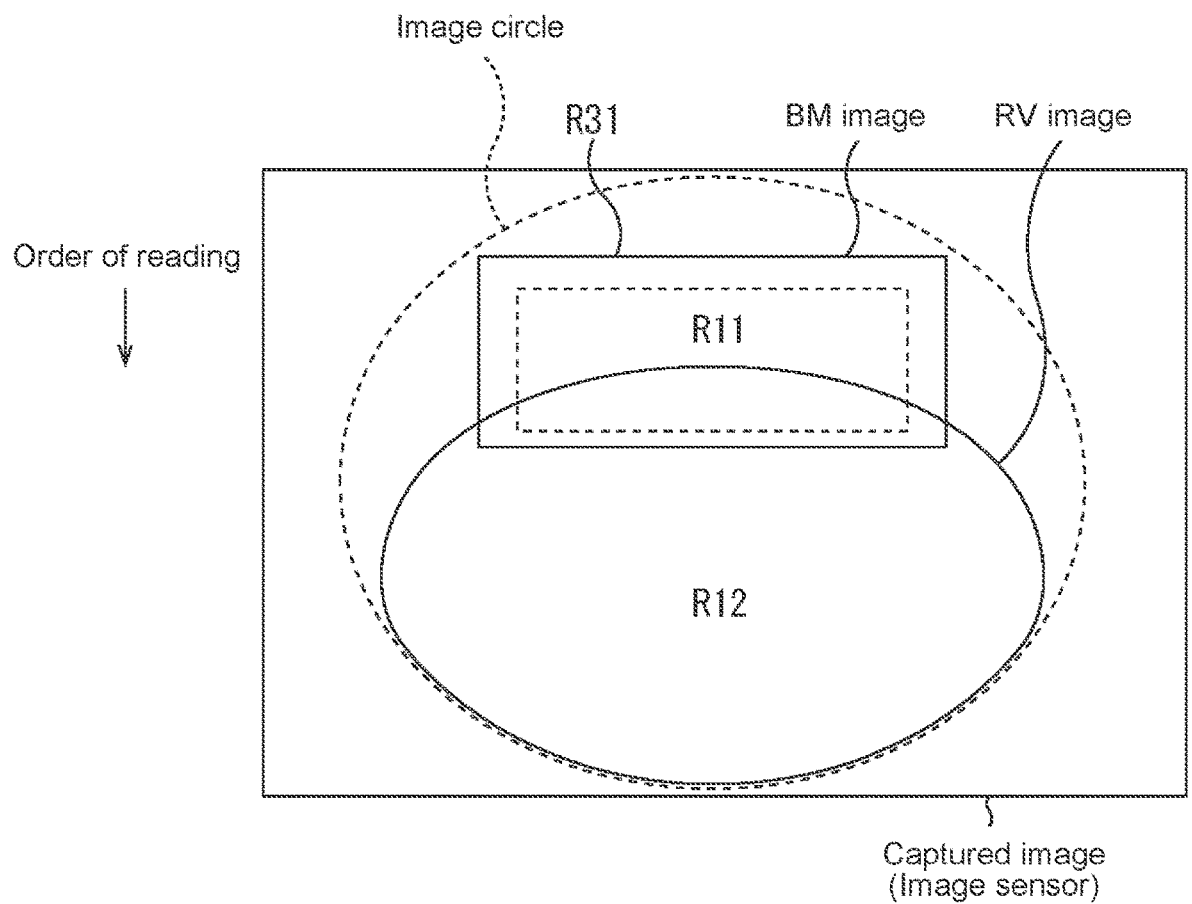
FIG. 24 is a diagram describing an example of a control of extraction of a BM image and an RV image from a captured image, the control being performed by a controller 181.

FIG. 24 is a diagram describing an example of a control of extraction of a BM image and an RV image from a captured image, the control being performed by the controller 181.

As in the case of FIG. 4, FIG. 24 illustrates an image circle of the optical system 31 and a captured image captured by the image sensor 32 (the light-receiving surface of the image sensor 32).

In the extraction control, the controller controls reading of data from the image sensor 32 such that the region R12 is extracted as an RV image, as in the case of the controller 136.

Further, 0262 tin the extraction control, the controller 181 controls reading of data from the image sensor 32 such that not the region R11 but a region R31 that is larger in size than the region R11 is extracted from the captured image as a BM image.

The region R31 is a region that includes a largest range that a driver can see using an interior rearview mirror by moving his/her line of sight or his/her head, if the interior rearview mirror is installed in the vehicle 10. The region R11 is a variable region of which the position is changed according to positions of the line of sight and the head of the driver, whereas the region R31 is a fixed region.

A region that is situated at a position depending on one of the positions of the line of sight and the head of the driver or depending on both of them, and has the same size as the region R11, is extracted by the extraction section 182 from the region R31 described above as a final BM image to be displayed on the BM display section 21. In other words, the region R11 to be observed by the driver using an interior rearview mirror if the interior rearview mirror is installed in the vehicle 10, is extracted by the extraction section 182 from the region R31 as a BM image.

<Display Processing>

Figure 25:
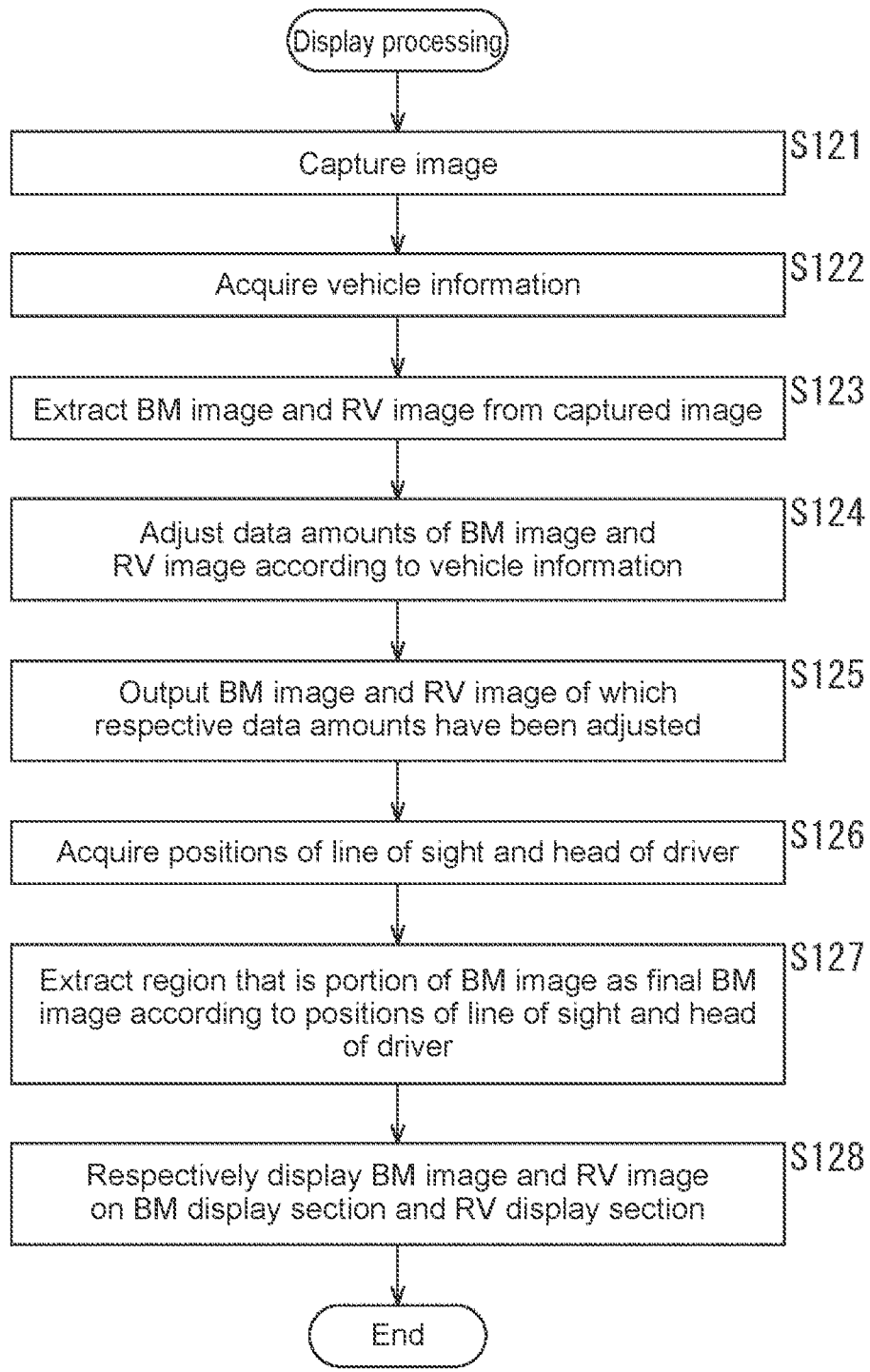
FIG. 25 is a flowchart describing an example of display processing of displaying a BM image and an RV image that is performed in the viewing system.

FIG. 25 is a flowchart describing an example of display processing of displaying a BM image and an RV image that is performed in the viewing system of FIG. 23.

In Step S121, the image sensor 32 captures a captured image, and the process moves on to Step S122.

In Step S122, the acquisition section 135 acquires vehicle information from the vehicle 10, and supplies the vehicle information to the controller 136. Then, the process moves on to Step S123.

In Step S123, the controller 136 controls extraction performed by the image sensor 32. As described with reference to FIG. 24, in accordance with the extraction control performed by the controller 136, the image sensor 32 extracts, from the captured image, the regions R31 and R12 as a BM image and an RV image, respectively. Then, the image sensor 32 supplies the BM image and the RV image to the data amount adjuster 133, and the process moves on to Step S124 from Step S123.

In Step S124, the controller 136 controls adjustment performed by the data amount adjuster 133 according to the vehicle information from the acquisition section 135. The data amount adjuster 133 adjusts data amounts of the BM image and the RV image from the image sensor 32 in accordance with the adjustment control performed by the controller 136. Then, the data amount adjuster 133 supplies, to the output section 134, the BM image and the RV image of which the respective data amounts have been adjusted, and the process moves on to Step S125 from Step S124.

In Step S125, the output section 134 outputs, to the outside of the camera unit 11, the BM image and the RV image that are supplied from the data amount adjuster 133 and of which the respective data amounts have been adjusted, and the process moves on to Step S126. Consequently, in FIG. 23, the BM image is supplied to the extraction section 182, and the RV image is transmitted to the RV display section 22.

In Step S126, the extraction section 182 acquires, from the vehicle 10, positions of the line of sight and the head of a driver that are included in the vehicle information, and the process moves on to Step S127.

In Step S127, the extraction section 182 extracts, from the BM image from the output section 134, a region that is situated at a position depending on the positions of the line of sight and the head of the driver and has the same size as the region R11, the region being extracted as a final BM image to be displayed on the BM display section 21. Then, the extraction section 182 transmits the final BM image to the BM display section 21, and the process moves on to Step S128 from Step S127.

In Step S128, the BM display section 21 displays thereon the BM image from the extraction section in accordance with the specification of the BM display section 21, and the RV display section 22 displays thereon the RV image from the output section 134 in accordance with the specification of the RV display section 22.

<Description of Computer to Which Present Technology is Applied>

Next, the series of processes described above can be performed using hardware or software. When the series of processes is performed using software, a program included in the software is installed on, for example, a general-purpose computer.

Figure 26:
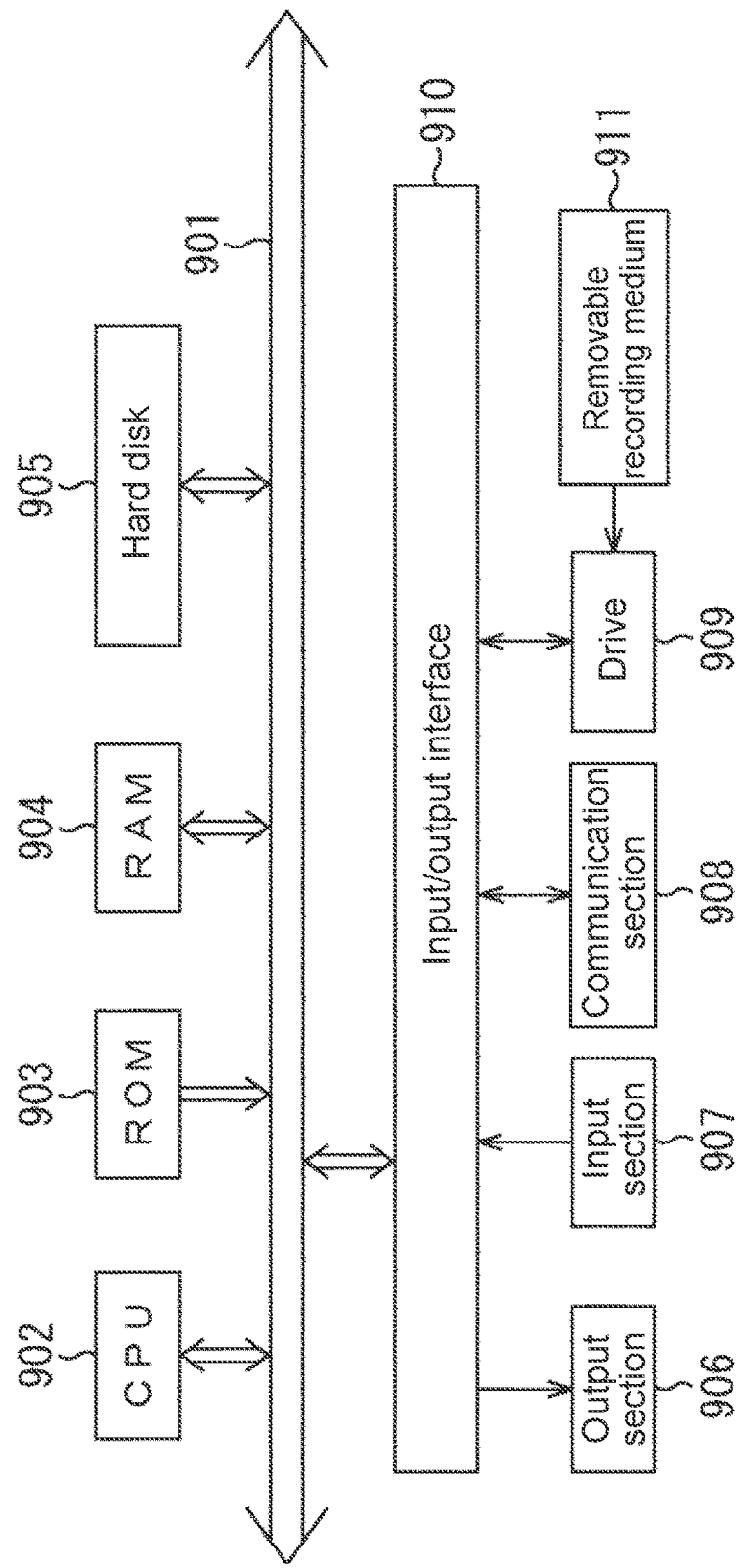
FIG. 26 is a block diagram illustrating an example of a configuration of an embodiment of a computer to which the present technology is applied.

FIG. 26 is a block diagram illustrating an example of a configuration of an embodiment of a computer on which a program used to perform the series of processes described above is installed.

The program can be recorded in advance in a hard disk 905 or a read only memory (ROM) 903 that is a recording medium included in the computer.

Alternatively, the program can be stored (recorded) in a removable recording medium 911 driven by a drive 909. Such a removable recording medium 911 can be provided as so-called package software. Here, examples of the removable recording medium 911 include a flexible disk, a compact disc read-only memory (CD-ROM), a magneto-optical (MO) disk, a digital versatile disc (DVD), a magnetic disk, and a semiconductor memory.

Note that, in addition to being installed on the computer from the removable recording medium 911 described above, the program can be downloaded to the computer through a communication network or a broadcast network to be installed on the hard disk 905 included in the computer. In other words, for example, the program can be wirelessly transferred to the computer from a download site through a satellite for digital satellite broadcasting, or can be transferred to the computer by wire through a network such as a local area network (LAN) or the Internet.

The computer includes a central processing unit (CPU) 902, and an input/output interface 910 is connected to the CPU 902 through a bus 901.

When a command is input by a user operating an input section 907 through the input/output interface 910, the CPU 902 executes a program stored in the ROM 903 according to the input command. Alternatively, the CPU 902 loads a program stored in the hard disk 905 into a random access memory (RAM) 904 and executes the program.

This results in the CPU 902 performing the processing according to the flowcharts described above or the processing performed on the basis of the configurations of the block diagrams described above. Then, for example, as necessary, the CPU 902 outputs a result of the processing using an output section 906 or transmits the processing result using a communication section 908 through the input/output interface 910, and the CPU 902 further records the processing result in the hard disk 905.

Note that the input section 907 includes, for example, a keyboard, a mouse, and a microphone. Further, the output section 906 includes, for example, a liquid crystal display (LCD) and a speaker.

Here, in the specification, the processes performed by a computer in accordance with a program does not necessarily have to be chronologically performed in the order of the descriptions in the flowcharts. In other words, the processes performed by a computer in accordance with a program include processes performed in parallel or individually (for example, parallel processing or processing performed using an object).

Further, the program may be a program on which processing is performed by a single computer (processor) or may be a program on which distributed-processing is performed by a plurality of computers. Furthermore, the program may be transferred to a remote computer to be executed by the remote computer.

Further, the system as used herein refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both the system.

Note that the embodiment of the present technology is not limited to the examples described above, and various modifications may be made thereto without departing from the scope of the present technology.

For example, the present technology may also have a configuration of cloud computing in which a single function is shared to be cooperatively processed by a plurality of apparatuses via a network.

Further, the respective steps described using the flowcharts described above may be shared to be performed by a plurality of apparatuses, in addition to being performed by a single apparatus.

Moreover, when a single step includes a plurality of processes, the plurality of processes included in the single step may be shared to be performed by a plurality of apparatuses, in addition to being performed by a single apparatus.

Note that the effects described herein are not limitative but are merely illustrative, and other effects may be provided.

Note that the present technology may take the following configurations.

<1> An image-capturing apparatus, including:
  an image sensor that captures an image displayed on a display section of a vehicle; and
  a controller that controls reading of the image from the image sensor on the basis of vehicle information acquired by the vehicle.
<2> The image-capturing apparatus according to <1>, further including
  a detector that detects inclination information regarding the vehicle using the vehicle information, in which
  according to the inclination information, the controller controls the reading of the image from the image sensor.
<3> The image-capturing apparatus according to <2>, in which
  the detector detects the inclination information indicating forward and rearward inclinations of the vehicle.
<4> The image-capturing apparatus according to <2>, in which
  the detector detects the inclination information indicating leftward and rightward inclinations of the vehicle.
<5> The image-capturing apparatus according to <2>, in which
  the detector detects the inclination information indicating forward and rearward inclinations of the vehicle and leftward and rightward inclinations of the vehicle.
<6> The image-capturing apparatus according to any one of <1> to <5>, in which
  the controller controls a reading position, in the image sensor, from which the image is read.
<7> The image-capturing apparatus according to <6>. In which
  the reading position is specified by a reading-start position and a size of the image read from the image sensor, the reading-start position being a position, in the image sensor, at which the reading of the image from the image sensor is started.
<8> The image-capturing apparatus according to any one of <1> to <7>, in which
  the controller controls the reading of the image from the image sensor such that a proportion of a road surface that appears in the image displayed on the display section is kept in a specified proportion.
<9> The image-capturing apparatus according to any one of <1> to <8>, further including
  a processing section that rotates the image read from the image sensor, and cuts an image to be displayed on the display section out of the rotated image.
<10> The image-capturing apparatus according to <9>, in which
  the controller controls the rotation of the image.
<11> The image-capturing apparatus according to <10>, in which
  the controller
    calculates a rotation angle used to rotate the image, according to inclination information regarding the vehicle, and
    controls the rotation of the image such that the image is rotated by the rotation angle.
<12> The image-capturing apparatus according to any one of <1> to <11>, in which
  the vehicle information is at least one of gyroscopic information obtained from a gyroscope of the vehicle, suspension information regarding a suspension of the vehicle, a front camera image obtained from a front camera used to capture an image of a region ahead of the vehicle, or GPS information obtained from the GPS.
<13> The image-capturing apparatus according to any one of <1> to <12>, in which
  the display section is a display section that is an alternative to a Class I mirror.
<14> A control method, including
  controlling reading of an image from an image sensor that captures the image, on the basis of vehicle information acquired by a vehicle, the image being displayed on a display section of the vehicle.
<15> A program that causes a computer to operate as a controller that controls reading of an image from an image sensor that captures the image, on the basis of vehicle information acquired by a vehicle, the image being displayed on a display section of the vehicle.

<16> The control method according to <14>, further including detecting inclination information regarding the vehicle using the vehicle information, in which
the controlling the reading of the image from the image sensor is performed according to the inclination information.

<17> The program according to <15> further causing the computer to operate as a detector that detects inclination information regarding the vehicle using the vehicle information, in which the controlling the reading of the image from the image sensor is performed according to the inclination information.

<18> The image-capturing apparatus according to any one of <1> to <13>, in which the vehicle information includes at least one of speed information regarding the vehicle or gear information regarding the vehicle.

<19> The control method according to <14> or <16>, in which the vehicle information includes at least one of speed information regarding the vehicle or gear information regarding the vehicle.

<20> The program according to <15> or <17>, in which the vehicle information includes at least one of speed information regarding the vehicle or gear information regarding the vehicle.

REFERENCE SIGNS LIST 10 vehicle
11 camera unit
21 BM display section
22 RV display section
23 in-vehicle camera
31 optical system
32 image sensor
33 output section
41 acquisition section
42 detector
43 controller
51 pixel array
52 input circuit
53 row selecting circuit
54 column selection circuit
55 AD converter
56 line buffer
57 output circuit
61 pixel
71 controller
72 processing section
133 data amount adjuster
134 output section
135 acquisition section
136 controller
181 controller
182 extraction section
901 bus
902 CPU
903 ROM
904 RAM
905 hard disk
906 output section
907 input section
908 communication section
909 drive
910 input/output interface
911 removable recording medium

The invention claimed is:

1. An image-capturing apparatus, comprising:
an image sensor that captures an image displayed on a display section of a vehicle;
a controller that controls reading of the image from the image sensor, wherein a reading-start position for reading of image data from the sensor is set based on vehicle information acquired by the vehicle; and
a detector that detects inclination information regarding the vehicle using the vehicle information, the inclination information comprising an angle at which the vehicle is determined to be inclined to the front or back;
wherein if the vehicle is determined to be inclined to the front, the controller shifts a region of the image downward according to the angle at which the vehicle is determined to be inclined to the front, and if the vehicle is determined to be inclined to the back, the controller shifts the region of the image upward according to the angle at which the vehicle is determined to be inclined to the back, such that a proportion of a road to the sky in the region of the image remains substantially the same;
wherein the vehicle information includes gear information regarding the vehicle,
wherein the image includes a range corresponding to a back mirror image and a rearview image and
wherein the back mirror image is displayed on a first display and the rearview image is displayed on a second display that is other than the first display.

2. The image-capturing apparatus according to claim 1, wherein
the detector detects the inclination information indicating leftward and rightward inclinations of the vehicle.

3. The image-capturing apparatus according to claim 1, wherein
the detector detects the inclination information indicating forward and rearward inclinations of the vehicle and leftward and rightward inclinations of the vehicle.

4. The image-capturing apparatus according to claim 1, wherein
the controller controls a reading position, in the image sensor, from which the image data is read.

5. The image-capturing apparatus according to claim 4, wherein
the reading position is specified by the reading-start position and a size of the image read from the image sensor, the reading-start position being a position, in the image sensor, at which the reading of the image from the image sensor is started.

6. The image-capturing apparatus according to claim 1, wherein
the controller controls the reading of the image data from the image sensor such that a proportion of a road surface that appears in the image displayed on the display section is kept in a specified proportion.

7. The image-capturing apparatus according to claim 1, further comprising
a processing section that rotates an image corresponding to the image data read from the image sensor, and cuts an image to be displayed on the display section out of the rotated image.

8. The image-capturing apparatus according to claim 7, wherein the controller controls the rotation of the image.

9. The image-capturing apparatus according to claim 8, wherein the controller calculates a rotation angle used to rotate the image, according to inclination information regarding the vehicle, and controls the rotation of the image such that the image is rotated by the rotation angle.

10. The image-capturing apparatus according to claim 1, wherein the vehicle information is at least one of gyroscopic information obtained from a gyroscope of the vehicle, suspension information regarding a suspension of the vehicle, a front camera image obtained from a front camera used to capture an image of a region ahead of the vehicle, or GPS information obtained from the GPS.

11. The image-capturing apparatus according to claim 1, wherein the display section is a display section that is an alternative to a Class I mirror.

12. A control method, comprising controlling reading of an image data from an image sensor that captures the image, wherein a reading-start position for reading of image data from the image sensor is set based on vehicle information acquired by the vehicle; and detecting inclination information regarding the vehicle using the vehicle information, the inclination information comprising an angle at which the vehicle is determined to be inclined to the front or back;

wherein if the vehicle is determined to be inclined to the front, the controller shifts a region of the image downward according to the angle at which the vehicle is determined to be inclined to the front, and if the vehicle is determined to be inclined to the back, the controller shifts the region of the image upward according to the angle at which the vehicle is determined to be inclined to the back, such that a proportion of a road to the sky in the region of the image remains substantially the same;

wherein the vehicle information includes gear information regarding the vehicle, wherein the image includes a range corresponding to a back mirror image and a rearview image and wherein the back mirror image is displayed on a first display and the rearview image is displayed on a second display that is other than the first display.

13. A non-transitory computer readable storage medium having computer readable instructions stored thereon that, when executed by a computer, cause a computer to:

operate as a controller that controls reading of an image data from an image sensor that captures the image, wherein a reading-start position for reading of image data from the image sensor is set based on vehicle information acquired by the vehicle; and operate as a detector that detects inclination information regarding the vehicle using the vehicle information, the inclination information comprising an angle at which the vehicle is determined to be inclined to the front or back;

wherein if the vehicle is determined to be inclined to the front, the controller shifts a region of the image downward according to the angle at which the vehicle is determined to be inclined to the front, and if the vehicle is determined to be inclined to the back, the controller shifts the region of the image upward according to the angle at which the vehicle is determined to be inclined to the back, such that a proportion of a road to the sky in the region of the image remains substantially the same;

wherein the vehicle information includes gear information regarding the vehicle, wherein the image includes a range corresponding to a back mirror image and a rearview image and wherein the back mirror image is displayed on a first display and the rearview image is displayed on a second display that is other than the first display.

14. The image-capturing apparatus according to claim 1, wherein the vehicle information further includes speed information regarding the vehicle.

15. The control method according to claim 12, wherein the vehicle information further includes speed information regarding the vehicle.

16. The non-transitory computer readable storage medium according to claim 13, wherein the vehicle information further includes speed information regarding the vehicle.

* * * * *